United States Patent
Di Cairano et al.

(10) Patent No.: US 10,307,863 B2
(45) Date of Patent: *Jun. 4, 2019

(54) CONTROL OF REDUNDANT LASER PROCESSING MACHINES

(71) Applicant: Mitsubishi Electric Research Laboratories, Inc., Cambridge, MA (US)

(72) Inventors: Stefano Di Cairano, Somerville, MA (US); Sohrab Haghighat, Cambridge, MA (US); Scott A. Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 708 days.

This patent is subject to a terminal disclaimer.

(21) Appl. No.: 14/198,694

(22) Filed: Mar. 6, 2014

(65) Prior Publication Data
US 2015/0158121 A1   Jun. 11, 2015

Related U.S. Application Data

(60) Provisional application No. 61/912,599, filed on Dec. 6, 2013.

(51) Int. Cl.
*B23K 26/03* (2006.01)
*B23K 26/08* (2014.01)
(Continued)

(52) U.S. Cl.
CPC ...... *B23K 26/0869* (2013.01); *B23K 26/0344* (2015.10); *B23K 26/04* (2013.01);
(Continued)

(58) Field of Classification Search
CPC ............ B23K 26/0869; B23K 26/0344; B23K 26/044; G05B 2219/42317
(Continued)

(56) References Cited

U.S. PATENT DOCUMENTS 5,347,446 A * 9/1994 Iino ..................... G05B 13/048
                                              700/29
5,452,275 A    9/1995 Ogawa et al.
(Continued)

OTHER PUBLICATIONS

Olaru S et al.: "Compact Explicit MPC with Guarantee of Feasibility for Tracking," Decision and Control, 2005, European Control Conference, CDC-E CC. Dec. 12-15, 2005. pp. 969-974.
(Continued)

*Primary Examiner* — Tu B Hoang
*Assistant Examiner* — Erin E McGrath
(74) *Attorney, Agent, or Firm* — Gennadiy Vinokur; James McAleenan; Hironori Tsukamoto

(57) ABSTRACT

A method controls an operation of a laser processing machine with redundant actuators including a first actuator and a second actuator. The method determines a feasible region for states of the first actuator and states of a reference trajectory of the first actuator defined by constraints of the laser processing machine, constraints on the reference trajectory and constraints on a range of motion of the second actuator. The method selects a subset of the feasible region, such that for any state of the first actuator and any state of the reference trajectory within the subset, there is an admissible control maintaining the state of the first actuator within the subset of the feasible region for admissible future states of the reference trajectory, and selects an admissible control action for controlling the operation such that the state of the first actuator remains in the subset of the feasible region.

16 Claims, 20 Drawing Sheets

(51) Int. Cl.
*B23K 26/38* (2014.01)
*G05B 17/02* (2006.01)
*B23K 26/04* (2014.01)
*B23K 26/082* (2014.01)
*B23K 26/044* (2014.01)

(52) U.S. Cl.
CPC .......... *B23K 26/044* (2015.10); *B23K 26/082* (2015.10); *B23K 26/38* (2013.01); *G05B 17/02* (2013.01); *G05B 2219/42317* (2013.01)

(58) Field of Classification Search
USPC .......................................... 700/56–63, 11–14
See application file for complete search history.

(56) References Cited

U.S. PATENT DOCUMENTS

| | | |
|---|---|---|
| 5,751,585 A | 5/1998 | Cutler et al. |
| 5,798,927 A | 8/1998 | Cutler et al. |
| 6,381,505 B1* | 4/2002 | Kassmann ............ G05B 13/048 700/28 |
| 6,706,999 B1 | 3/2004 | Barrett et al. |
| 6,744,228 B1* | 6/2004 | Cahill .................. H02K 41/031 318/135 |
| 7,376,472 B2* | 5/2008 | Wojsznis ............... G05B 11/32 700/28 |
| 7,454,253 B2* | 11/2008 | Fan ...................... G05B 13/048 700/29 |
| 8,504,175 B2* | 8/2013 | Pekar ................... G05B 13/048 700/12 |
| 2007/0040527 A1 | 2/2007 | Cardinale et al. |
| 2012/0095599 A1* | 4/2012 | Pak ........................ B25J 9/1664 700/275 |
| 2013/0190898 A1 | 7/2013 | Shilpiekandula et al. |

OTHER PUBLICATIONS

Limon D et al.: "MPC for Tracking Piecewise Constant Referemces for Constrained Linear Systems," Automatica, Pergamon, Amsterdam, NL. vol. 44, No. 9. Sep. 1, 2008, pp. 2382-2387.

Kerrigan et al.: "Invariant sets for Constrained Nonlinear Discrete-Time Systems with Application to Feasibility in Model Predictive Control," Proceedings of the 39th IEEE Conference on Decision and Control. Dec. 12-15, 2000. Sydney Convention and Exhibition Centre. vol. 5, Jan. 1, 2001. pp. 4951-5956.

* cited by examiner

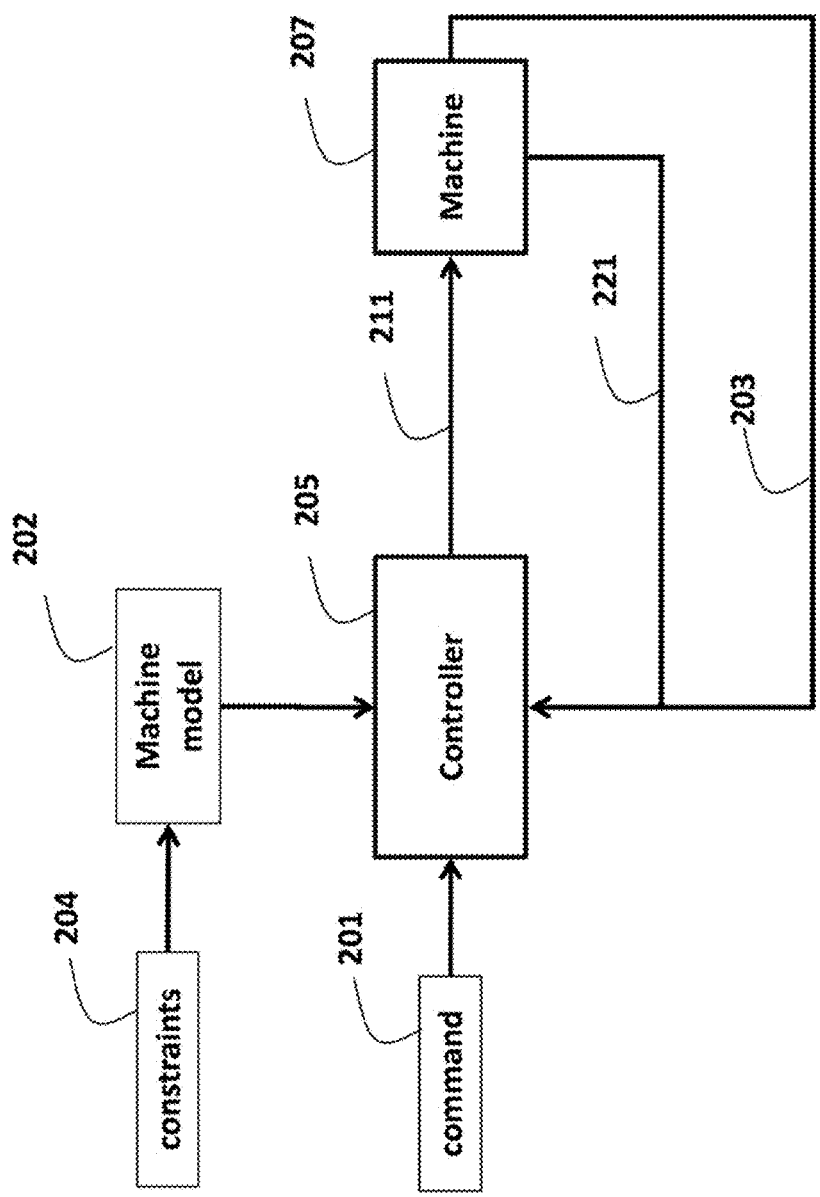

CONTROL OF REDUNDANT LASER PROCESSING MACHINES

CROSS-REFERENCE TO RELATED APPLICATIONS

This application claims the priority under 35 U.S.C. § 119(e) from U.S. provisional application Ser. No. 61/912,599 filed on Dec. 6, 2013, the disclosure of which is being incorporated herein by reference.

FIELD OF THE INVENTION

The present invention relates generally to controlling laser processing machines, and more particularly to controlling laser processing machines with redundant actuators.

BACKGROUND OF THE INVENTION

A laser processing machine with redundant actuators includes multiple actuators for moving a position of a laser beam along one direction. Thus, the laser beam is overactuated, and degrees of freedom are available to optimize the actuation of the laser beam along a desired processing pattern. For example, the laser beam can be positioned by independent operations of the redundant actuators, and thus the task of positioning the laser beam along the processing pattern can be separated between redundant actuators. A reference trajectory for each redundant actuator should be generated such that the combined motion of the actuators results in the laser beam tracking the processing pattern.

Some conventional methods, see, e.g., U.S. Pat. Nos. 5,452,275, 5,798,927, 5,751,585, 6,706,999, use frequency separation techniques to assign the task of positioning the laser beam to two actuators. For example, the processing pattern is filtered by a low pass filter. The filtered signal becomes a reference trajectory for one actuator, while a difference between the processing pattern and the filtered signal becomes a reference trajectory for another actuator. However, the filtering does consider various constraints of the actuators, such as constraints on the accelerations or velocities. Furthermore, there is no guarantee that the separation in frequencies provides the optimal reference trajectories.

One method described in U.S. Publication 2013/0190898 generates the reference trajectories that account for the constraints based on Model Predictive Control (MPC). MPC is based on an iterative, finite horizon optimization of a model of a machine and has the ability to anticipate future events to take appropriate control actions. This is achieved by optimizing the operation of the machine over a future finite time-horizon subject to constraints, and only implementing the control over the current timeslot. For example, the constraints can represent physical limitation of the machine, legitimate and safety limitations on the operation of the machine, and performance limitations on a trajectory. A control strategy for the machine is admissible when the motion generated by the machine for such a control strategy satisfies all the constraints.

For example, at a current time t, a state of the machine is sampled and an admissible cost minimizing control strategy is determined for a relatively short time horizon in the future. Specifically, an online or on-the-fly calculation determines a cost-minimizing control strategy until a future time t+T. Only the first step of the control strategy is implemented, then the state is sampled again and the calculations are repeated starting from the new current state, yielding a new control and new predicted state path. The prediction horizon is continuously shifted forward. For this reason, MPC is also called receding horizon control.

However, due to the tracking nature of the MPC in this problem, such a receding horizon control approach has no guarantee, in general, of finding a solution to the optimization problem. Due to the receding horizon nature of the finite horizon optimal control problem, the existence of the solution for a certain window of data (horizon) does not by itself guarantees that when the data window are shifted, a solution still exists.

Accordingly, there is a need for a method for controlling an operation of a laser processing machine with redundant actuators that guarantees a priori satisfaction of constraints of the operation for variety of processing patterns.

SUMMARY OF THE INVENTION

It is an objective of some embodiments of the invention to provide a system and a method for controlling a constrained operation of a laser processing machine according to a processing pattern. It is another objective to provide such a system and a method that guarantees that at any moment of the controlling there is a reference trajectory resulting in a feasible state of the machine satisfying the constraints of the operation for all possible future variations of the reference trajectory.

Various embodiments of the invention transform the tracking problem into an optimization problem subject to constraints. For example, some embodiments of the invention are based on a realization that the processing pattern can be modeled by a dynamical system driven by a bounded unpredictable input. Such realization allows defining the problem as the control of a dynamical system to track a reference trajectory generated by another uncertain bounded dynamical system. The constraints on the input of the reference trajectory can reduce the need for determining the entire reference trajectory in advance, which can be advantageous for some controller with limited computation capabilities.

Some embodiments of the invention are based on another realization that a rate of change in time of the reference trajectory can be considered as a design parameter. Given space-based processing pattern, a time-based a reference trajectory can be determined to satisfy the rate of change of the reference trajectory.

Some embodiments of the invention are based on another realization that in order to correctly track the processing trajectory be the laser processing machine having redundant actuators, a reference trajectory of a first actuator has to track the processing pattern with a tracking error bounded by the operating range of the second actuator, although the tracking error does not need to be zero. In those applications, the tracking error on the reference trajectory can also be represented as a constraint to be satisfied.

The constraints of the machine, constraints on the transient of the reference trajectory and constraints on bounds of a tracking error form a feasible region of a state of the laser processing machine and a state of the reference trajectory. Accordingly, it is possible to optimize the control maintaining the state of the machine and the state of the reference trajectory within that feasible region and, thus, to convert the tracking problem into purely optimization problem.

Due to the nature of optimization-based receding horizon control, the existence of a solution for a certain horizon does not by itself guarantees the existence of the solution for a subsequent horizon. However, some embodiments of the invention are based on yet another realization that it is possible to select a subset of the feasible region, such that from any state of the laser processing machine and of the reference trajectory within that subset, there is a control maintaining the state of the machine within the subset. Accordingly, if a cost function representing the operation of the machine is optimized subject to constraints defined by that special subset of the feasible region, as contrasted with the optimization within the feasible region itself, there is a guarantee that the resulting optimal trajectory tracks the reference trajectory with the bounded error, and is always feasible.

Accordingly, one embodiment discloses a method for controlling an operation of a laser processing machine with redundant actuators including a first actuator and a second actuator. The method includes determining a feasible region for states of the first actuator and states of a reference trajectory of the first actuator defined by constraints of the laser processing machine, constraints on the reference trajectory and constraints on a range of motion of the second actuator; selecting a subset of the feasible region, such that for any state of the first actuator and any state of the reference trajectory within the subset, there is an admissible control maintaining the state of the first actuator within the subset of the feasible region for admissible future states of the reference trajectory determined by according to a model of the reference trajectory and the constraints of the reference trajectory; and selecting an admissible control action for controlling the operation such that the state of the first actuator remains in the subset of the feasible region. The steps of the method are performed by a processor.

Another embodiment discloses a controller for controlling an operation of a first actuator of a laser processing machine according to a reference trajectory by selecting a control action for controlling the operation such that a state of the first actuator for admissible future states of the reference trajectory remains in a subset of the feasible region of states of the first actuator and states of the reference trajectory, wherein the feasible region is defined by constraints of the first actuator, constraints on the reference trajectory and constraints on a range of motion of a second actuator of the laser processing machine, and wherein the subset of the feasible region is a control invariant, such that for any state of the first actuator within the subset, there is a control maintaining the state of the first actuator within the subset for all admissible future states of the reference trajectory.

Yet another embodiment discloses a method for controlling an operation of a laser processing machine according to a processing pattern, wherein the laser processing machine includes a first actuator and a second actuator. The method includes determining a time-based reference trajectory of the first actuator tracking the processor pattern with an error bounded by a range of motion of the second actuator of the laser processing machine, such that a control action that changes a state of the first actuator according to the reference trajectory maintains the state of the first actuator within a subset of the feasible region of states of the first actuator and states of the reference trajectory, wherein the feasible region is defined by constraints of the first actuator, constraints on the reference trajectory and constraints on the range of motion of the second actuator of the laser processing machine, and wherein the subset of the feasible region is a control invariant, such that for any state of the first actuator within the subset, there is a control maintaining the state of the first actuator within the subset for all admissible future states of the reference trajectory; and controlling the first actuator according to the time-based reference trajectory.

BRIEF DESCRIPTION OF THE FIGURES

FIG. 2A is a block diagram of a controller and laser processing machine according to embodiments of the invention;

DETAILED DESCRIPTION OF THE PREFERRED EMBODIMENTS

Some embodiments of the invention provide a system and a method for controlling an operation of a redundant laser processing machine. Some embodiments control the machine using an optimization-based receding horizon control subject to constraints that guarantees the feasibility of tracking the reference trajectory with an error defined by bounds of a tracking error. A non-limited example of the receding horizon control is a Model Predictive Control (MPC).

Figure 1A:
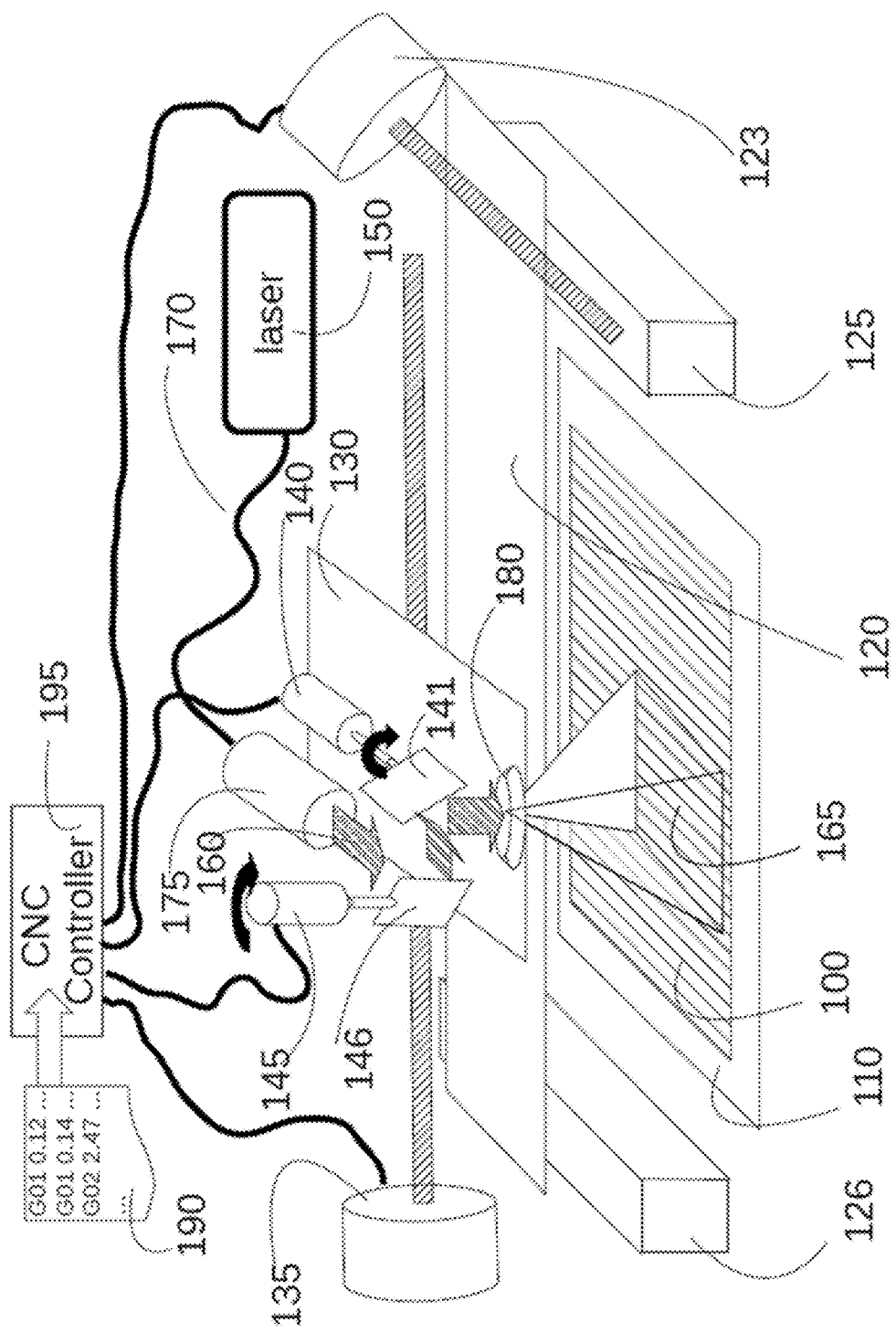
FIG. 1A is an isometric view of a redundant laser processing machine according to one embodiment of an invention.

FIG. 1A shows an isometric view of an example laser processing machine according to one embodiment of an invention. The laser processing machine is shown for illustration purpose and the design of this machine is not intended to limit the scope of the invention. The laser processing machine includes a slow actuator and a fast actuator, examples of which are provided below.

A workpiece 100 is supported on a beam dump 110 beneath a gantry 120. The gantry moves on rails 125 and 126 along a first direction, e.g., along a Y-axis. The gantry 120 is moved along the first direction by a first servo motor and a first screw 123. A platform 130 is arranged on the gentry 120 and moves with the gentry along the first direction. Also, the platform 130 is moved along a second direction, e.g., along an X-axis, by a second servo motor and a second screw 135. In this embodiment, the gantry 120, the first servo motor and the first screw 123, and the second servo motor and the first screw 135 form a motion system for moving the platform in a plane parallel to the workpiece along the first and the second direction. However, other embodiments of the invention use different types of the prismatic joints to move the platform. For example, the first prismatic joint can include a first direction linear drive motor, and the second prismatic joint can include a second direction linear drive motor.

A galvano-assembly, e.g., a two-axis galvano scan head having two orthogonal galvano drives, i.e., a first drive 140 and a second drive 145, a first mirror 141 and a second mirror 146, is arranged on the platform 130. A third motion of the first mirror 141 caused by the first driver 140 positions the laser beam along a third direction, and a fourth motion of the second mirror 146 caused by the second driver 145 positions the laser beam along a fourth direction.

In the context of this description, the gantry 120 is a first actuator, or the slow actuator, with large operating range, and the galvano assembly is a second actuator, or the fast actuator, with smaller operating range. However, such usage is not intended to limit the scope of the claims. For example, in some variations the first actuators is the fast actuator, and the second actuator is the slow actuator.

In various embodiments, the galvano assembly is arranged on the platform such that the third direction is fixed with respect to the first direction, and the fourth direction is fixed with respect to the second direction. For example, in one embodiment, the first direction coincides with the third direction, and the second direction coincides with the fourth direction. In another embodiment, the first direction forms an angle of 45 degrees with the third direction, and the second direction forms the angle of 45 degrees with the fourth direction.

The galvano assembly can be affixed to the platform in order to fix the direction of motion. Alternatively, the galvano assembly can be arranged on the platform rotationally, such that the mutual orientations of the first, the second, the third, and the fourth directions can be fixed before, or during the operation of the laser processing machine. In the context of this invention, the galvano assembly is the second stage, or fast stage, with small operating range.

The laser processing machine can include a laser 150 for directing a cutting laser beam 160 to the first 141 and the second 146 mirrors of the galvano assembly via an optical fiber 170 and a collimator 175. In an alternative embodiment, the laser beam is directed to the galvano assembly via diagonal mirrors moving along the Y-gantry and X-axis platform. However, other variations are also possible.

The collimated cutting laser beam 160 is directed by the mirrors through a focusing module 180 for focusing the laser beam on the workpiece, producing a combined X-axis and Y-axis galvano assembly scan area 165 on the workpiece 100, and cutting the workpiece 100. An example of the focusing module 180 is a field-flattening F-theta lens or a non-telecentric F-theta lens. A size of the workpiece 100 can be greater than the galvano scan area 165 due to the motion of the platform.

In some embodiments, the control module includes a computer numerical control (CNC) controller 195. Other embodiments can use different types of controllers. The control module may control the motion system and the galvano assembly according to precomputed G-code 190 that defines a trajectory of positions of the laser beam or can performs the computations to decide how to control the machine. For example, the computations can define successive positions for the X-axis platform 130, the Y-axis gantry X-motion galvano assembly and mirror 141, and Y-motion galvano assembly and mirror 146.

In general the machines are built with actuators that have different dynamical behaviors. For example, the first actuator is in usually significantly slower than the second actuator, due to the difference in the displaced mass. From this difference, the indicated names of slow and fast actuators are derived.

Figure 1B:
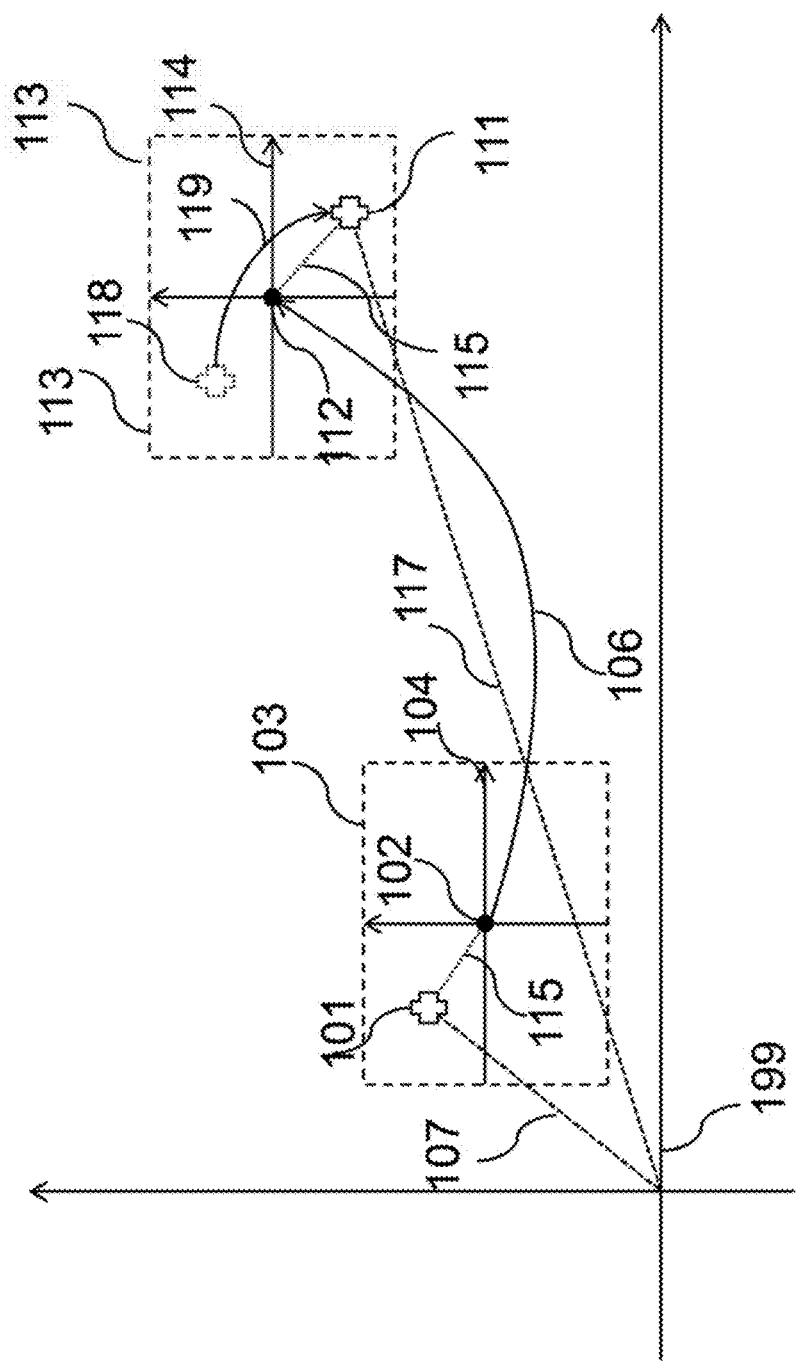
FIG. 1B is a representation of the operating range of the laser processing machine according to one embodiment of an invention.

FIG. 1B shows the relation between the position of the laser beam and the positions achieved by the slow and fast actuation. Given the global coordinate frame 199, the global position 107 of the laser beam 101 is determined based on the position of the slow actuator 102, and the relative position of the fast stage 115 in the relative coordinate frame 104 centered at the position of the slow actuator 102. The area of reachable position for the fast actuator and for the laser beam is bounded by the area 103. Following a movement 106 for the position 112 of the slow actuator, the area of reachable position for the fast actuator and for the laser beam is 113. Following a concurrent movement 119 of the fast actuator, the laser beam is not at the position 118, but is in the position 111, with relative position 115 in frame 114 centered on the position of the slow actuator and a position 117 in the global coordinate frame 199.

Thus, the machine operating range at any time is centered at the current position of the slow actuator, and has size equal to the size of the operating range of the fast actuator. By changing the position of the slow actuator, the current machine operating range is also changed, thus realizing an overall operating range, which is the composition of the operating range of the slow actuator and the operating range of the fast actuator.

Some embodiments of the invention consider constraints of the slow and fast actuators of the laser processing machine in determining trajectory and controlling the operation of the machine. For the purpose of the clarity of this disclosure, the laser processing machine with redundant actuator is arranged such that the slow actuator has larger operating range, but smaller velocity and acceleration limits than the fast actuator, while the fast actuator has smaller operating range, but larger velocity and acceleration limits than the slow actuator.

Tracking Using Control Invariant Sets

Some embodiments of the invention provide a system and a method for controlling an operation of the laser processing machine according to a model of a reference trajectory. Some embodiments control the machine using an optimization-based receding horizon control subject to constraints that guarantees the feasibility of tracking the reference trajectory with a bounded error. A non-limited example of the receding horizon control is a model predictive control (MPC).

FIG. 2A shows an example machine 207, such as laser processing machine, connected to controller 205, e.g., the MPC controller, according to some embodiments of the invention. The controller 205 is programmed according to a model 202 of the machine. The model can be a set of equations representing changes of a state 221 and output 203 of the machine 207 over time as functions of current and previous inputs 211 and previous outputs 203. The model can include constraints 204 that represent physical and operational limitations of the machine.

During the operation, the controller receives a command 201 indicating the reference behavior of the machine. The command can be, for example, a motion command. In response to receiving the command 201, the controller generates input u 211 for the machine. In response to the input, the machine updates the output y 203 and the state x 221 of the machine.

Figure 2B:
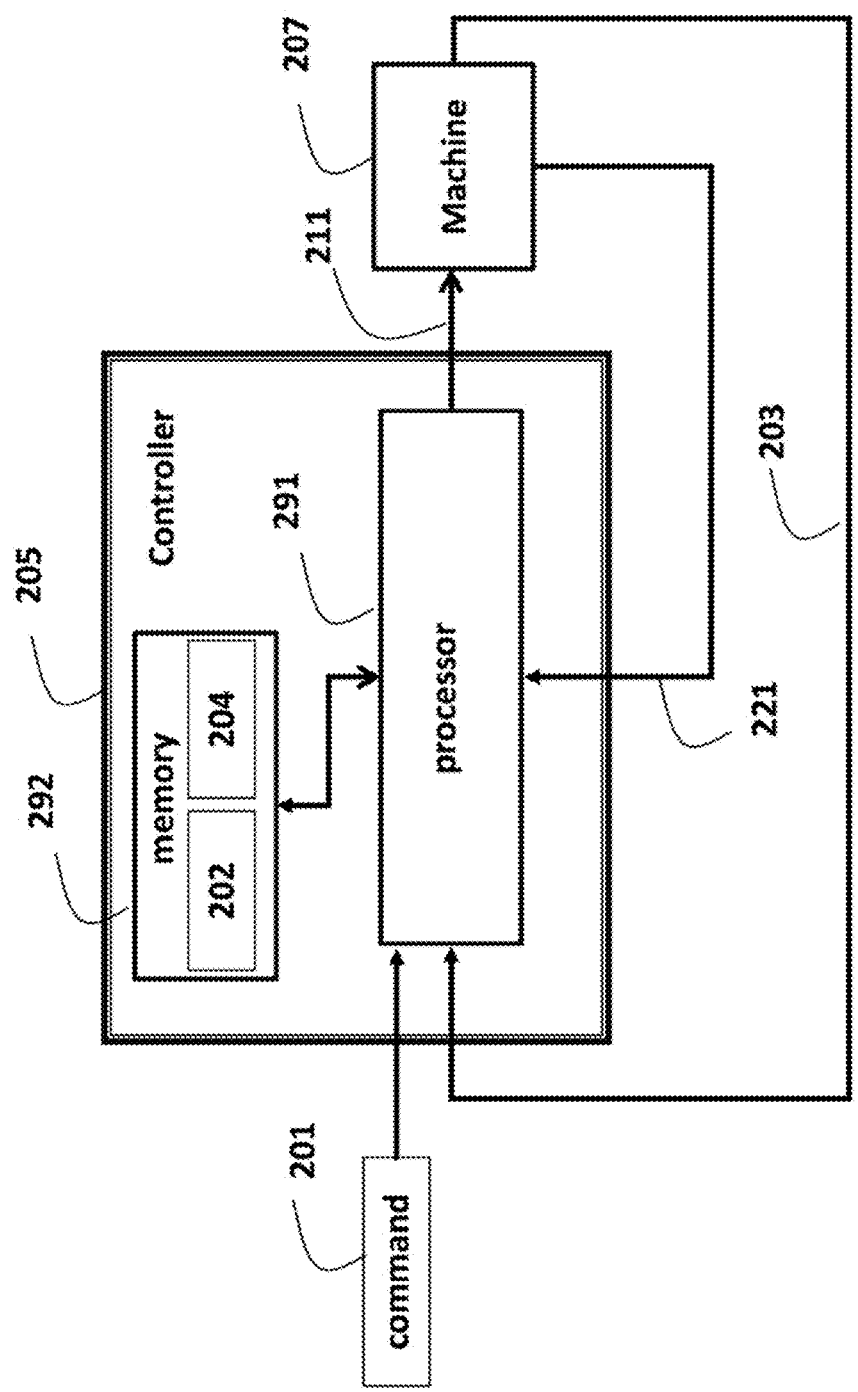
FIG. 2B is a block diagram of the controller according to embodiments of the invention.

FIG. 2B shows a block diagram of the controller 205 according one embodiment of the invention. The controller 205 includes a processor 291 connected to a memory 292 for storing the model 202 and the constraints 204, such as constraints of the machine, e.g., physical and specification constraints, constraints on a transient of the reference trajectory and constraints on bounds of a tracking error. For example, the constraints on the transient of the reference trajectory can include a possible type of changes of the state of the reference trajectory, rates of the change of the state of the reference trajectory among others. The bounds of the tracking error can include the allowed difference between a function the state of the machine and a function of the state of the reference trajectory. The function can be, e.g., identity function, linear combination.

Figure 3:
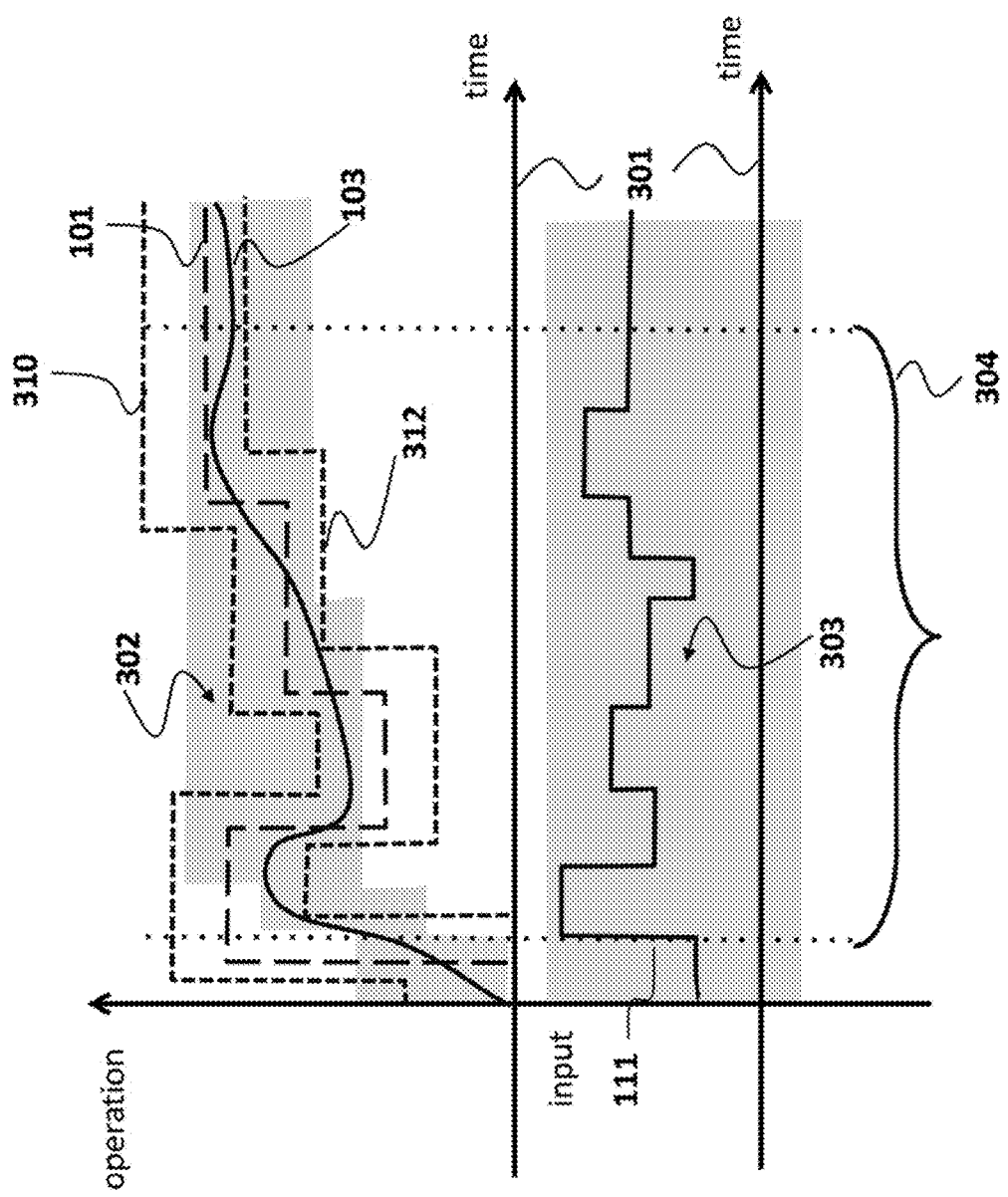
FIG. 3 is a timing diagram of machine motions according to embodiments of the invention.

FIG. 3 shows a timing diagram of the operation, e.g., motions, of the machine 207 according to some embodiments of the invention. The controller 205 generates the input 211 for the machine to perform the reference operation while enforcing the constraints using the expected machine behavior according to the model. The controller at each time k 301, solves a finite time optimal control problem for a prediction interval 304, e.g., from the current time till the N next times. The constraints can include constraints of the machine including regions of feasible states and outputs 302 and feasible input 303.

Some embodiments of the invention are based on a realization that the laser control problem can be expressed as a bounded tracking problem of only one actuator, e.g., the slow actuator. For example, the slow actuator needs to track the processing pattern with an error smaller than an operation range of the fast actuator while enforcing the constraints of the slow actuator. Some embodiments solve this tracking problem by controlling the operation of the slow actuator within a subset of a feasible region of the states of the slow actuator of the laser processing machine and states of the reference trajectory, wherein the subset of the feasible region is control invariant with respect to all possible future values of the reference trajectory.

One embodiment model the dynamics of the slow actuator as $$p(k+1) = p(k) + T_s v(k) \quad (1)$$
$$v(k+1) = v(k) + \frac{T_s}{J}(L\tau - \beta v(k)),$$

where p is a position of the slow actuator, v is a velocity of the slow actuator, $\tau$ is a torque of the slow actuator, $T_s$ is a control period of the machine at which a control cycle is executed, k is an index of the control cycle, J is an inertia of the slow actuator, L is a length of a pitch of a ball screw which converts the longitudinal motion into linear notion, and $\tau$ is the torque of the slow actuator, $\beta$ is a friction coefficient determining the friction torque on the slow actuator for a given angular velocity of the slow actuator.

In general, parameters p, v, t are two dimensional vectors with x and y coordinates, and are subject to constraints $$p_{min} \leq p(k) \leq p_{max}$$
$$v_{min} \leq v(k) \leq v_{max}$$
$$a_{min} \leq a(k) \leq a_{max}$$
$$\tau_{min} \leq \tau(k) \leq \tau_{max}, \quad (2)$$

that define lower and upper bounds on position p, velocity v, acceleration a, and torque $\tau$.

One embodiment expresses the model 202 of the slow actuator as a linear difference equation $$x(k+1) = Ax(k) + Bu(k)$$
$$y(k) = Cx(k)' \quad (3)$$

where k is a time instant when the signals are sampled, i.e., the index of the control cycle, u is the machine input, y is the machine output, x is the state of the machine, and A, B, C, are parameters of the model. For example, x=[p, v]', y=p, u=$\tau$, and A, B, C are matrices of appropriate dimensions, and the operation of the slow actuator is subject to linear constraints $$x(k) \in X, u(k) \in U, \forall k \geq 0, \quad (4)$$

where X, U are polyhedral sets.

Some embodiments determine the model of the reference trajectory having a position and a rate of change of the reference trajectory as states of the model or inputs to the model. Such models can represent all possible future reference trajectories and the constraints on those trajectories needed for the determination of the control invariant subset. For example, one embodiment models the reference trajectory r as a constrained integrator of the rate of change of the reference trajectory $\gamma$ according to $$r(k+1) = r(k) + \gamma(k)$$
$$d(k) = r(k), \quad (5)$$

subject to constraints $$r_{min} \leq r(k) \leq r_{max}, \quad (6)$$

The rate of change can be unknown but bounded $$\gamma_{min} \leq \gamma(k) \leq \gamma_{max}, \quad (7)$$

where the bounds on $\gamma$ ($\gamma_{min}$, $\gamma_{max}$) can be selected, e.g., as described below.

Thus the reference trajectory can be modeled as a linear system $$r(k+1)=A_r r(k)+B_r \gamma(k),$$

$$d(k)=C_r r(k), \quad (8)$$

where $r \in R$ is a reference state of the reference model and d is a reference output of the reference model, $\gamma \in \Gamma$ is the reference input, and $A_r$, $B_r$, $C_r$, are the parameters that define the model of the reference trajectory. For instance for the constrained integrator model the reference trajectory on each axis s defined by $A_r=1$, $B_r=1$, $C_r=1$.

It is realized that the dynamics of the constrained integrator model in (5) is the simplest model that allows representing time trajectories that generate any spatial laser processing pattern. Hence (5) is the model that requires minimal complexity in terms of parameter selection and computations and still allow processing any processing pattern. However, in other embodiments of this invention different models for the reference trajectory are developed according to (8), by selecting the values of $A_r$, $B_r$, $C_r$.

The enforcement of the constraints on the fast actuator results in the constraint connecting the linear system in (3) and the reference system in (5) as $$F_{min} \leq p(k)-d(k) \leq F_{max} \quad (9)$$

where $F_{max}$, $F_{min}$ are the maximal and minimal value for the position of the fast actuator generated achieved during operation of the machine. Some embodiments allow values of $F_{max}$, $F_{min}$ to be a fraction of the actual physical range of the fast actuator, for instance half of the range, or a third of the range.

The bounds on the rate of change $\gamma$ of the reference trajectory determine how fast the reference position for the laser beam is allowed to move. If the rate of change $\gamma$ is smaller, then the laser processing is slower. If the rate of change $\gamma$ is larger, then the laser processing is faster.

For dynamics in equations (3) and (5), subject to constraints in equations (2), (6), (9) and with unknown bounded rate of change $\gamma$ satisfying the equations (7), a set of constraints $$H_x x(k)+H_r r(k) \leq H_c, \quad (10)$$

can describe the machine states and reference states with dynamics according to equations (3) and (5) such that every possible future value of the reference trajectory that satisfies equations (6) and (7) can always be tracked within the range (9) of the fast actuator while always satisfying constraints (4).

From equation (10), the constraints on the control command for given state of the machine state and the reference trajectory are $$M_x x(k)+M_r r(k)+M_u u(k) \leq M_c, \quad (11)$$

which describes the commands such that every future reference that satisfies equations (5), (6), (7) can be tracked within the range of the fast actuator in equations (9), while satisfying constraints in equation (4) from the current state and reference state that satisfy the constraints in equation (10), while also guaranteeing that constraints in the equations (10) will be satisfied in the future.

Figure 4:
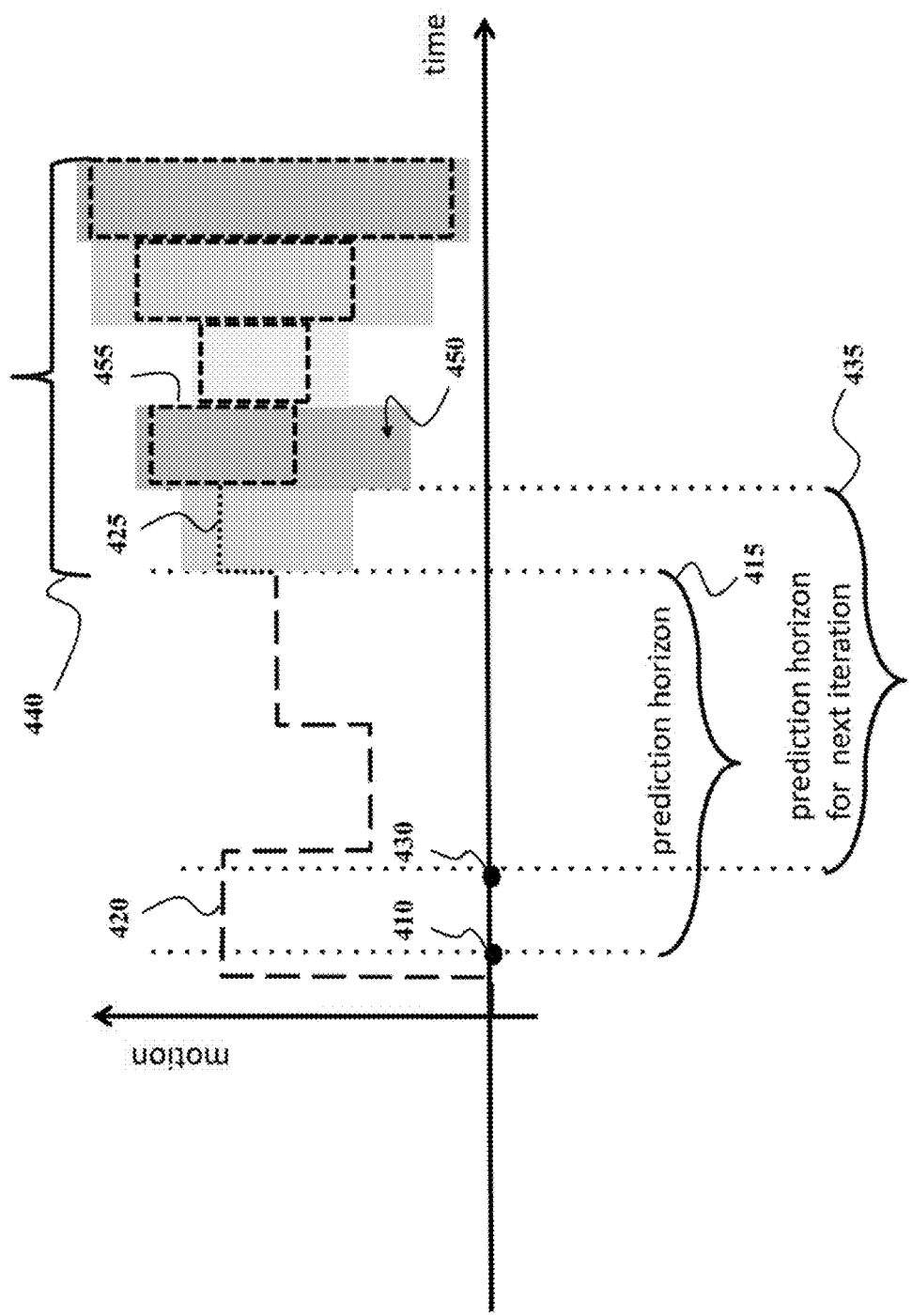
FIG. 4 is a diagram of a model of the reference trajectory and constraints on a transient of the reference trajectory according to embodiments of the invention.

FIG. 4 shows a diagram of the uncertainty of the model of the reference trajectory and the constraints on the rate of change of the reference trajectory. For example, for some iterations, such as a current iteration at a current time 410 for a prediction horizon 415, the reference trajectory 420 is known. But for some other iterations, e.g., for a next iteration at a time 430 for a next prediction horizon 435, the reference trajectory at a step 425 is unknown.

The model of the reference trajectory constrains a range 440 of possible future reference motions, thus providing the constraints on transients of the reference trajectory. The constraints can be determined in advance, but also can vary in dependence to previously determined trajectory. For example, the constraints on the range of the reference trajectory at a specific time can be determined by a region 450. However, when the trajectory is determined at a step 425, the constraints on the range of the reference trajectory can be tightened to a region 455. Thus, at the specific iteration, the region 455 defines the constraints on the range of the reference trajectory.

The constraints on the state of the machine, constraints on the reference trajectory and the constraints on a range of motion of a fast actuator of the laser processing machine form a feasible region of a state of the machine and a state of the reference trajectory. Accordingly, it is possible to optimize the control maintaining the state of the machine and the state of the reference trajectory within that feasible region and, thus, to convert the tracking problem into a purely optimization problem.

Figure 5:
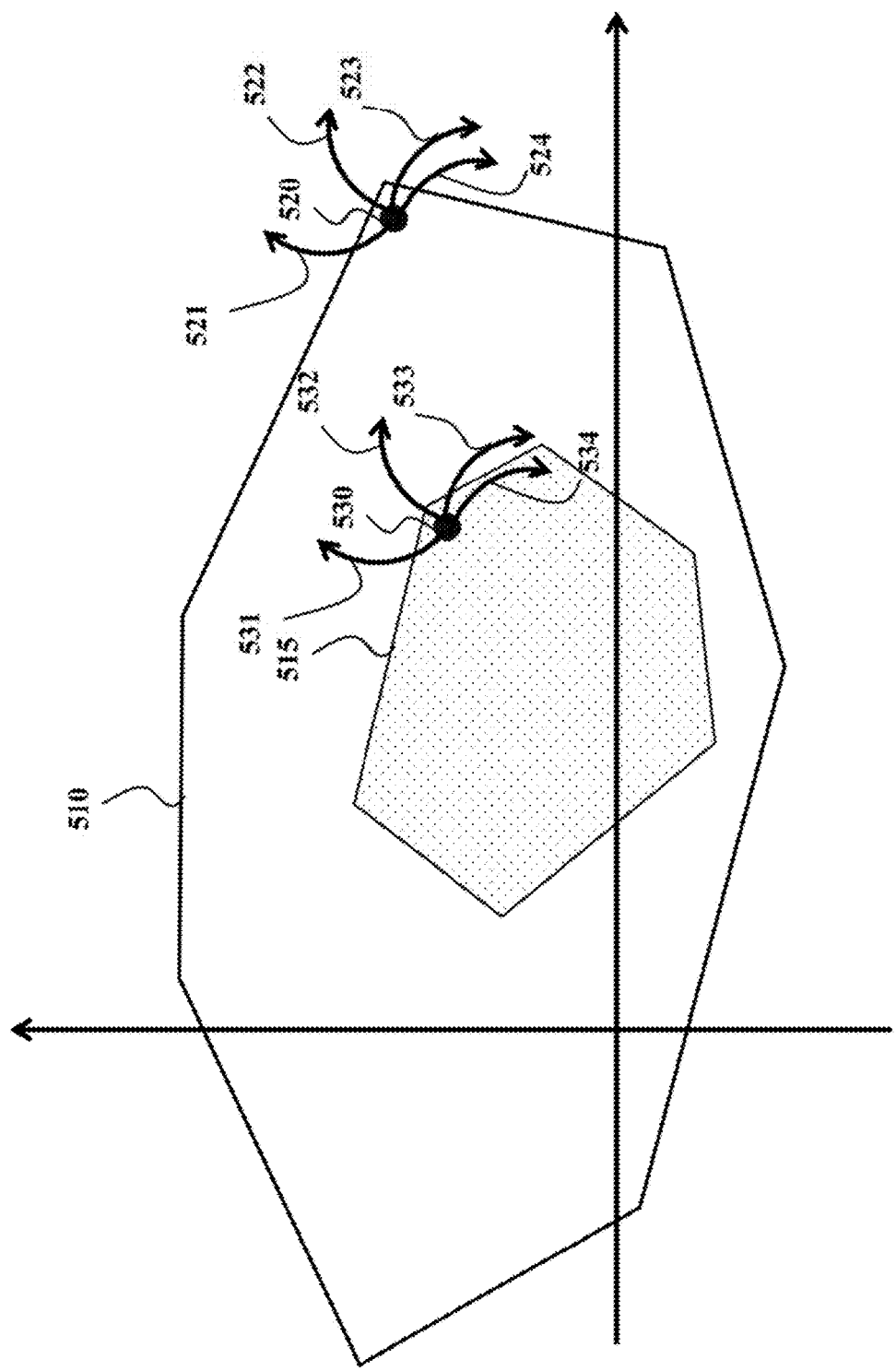
FIG. 5 is an example of a two-dimensional projection of the feasible region form by various constraints according to embodiments of the invention.

FIG. 5 shows an example of a two-dimensional projection of the feasible region 510 defined by various constraints on the operation of the laser processing machine according to embodiments of the invention. Due to the nature of receding horizon control, the existence of a solution for a certain horizon does not by itself guarantees the existence of the solution for a subsequent horizon. For example, the state of the machine and a state of the reference trajectory 520 can be optimal and feasible for one iteration, but all control actions 521-524 that controller is allowed to take during the next iteration can bring a state of the machine outside of the feasible region 510.

Some embodiments of the invention are based on yet another realization that it is possible to select a subset 515 of the feasible region, such that from any state of the machine within that subset, there is a control action maintaining the state of the machine within the subset for the known future states of the reference trajectory or for all admissible future states of the reference trajectory. For example, for any state such as a state 530 within the subset 515 and within all possible control actions 531-534 that the controller can execute, there is at least one control action 534 that maintains the state of the machine and reference within the subset 515.

Accordingly, if a control action for controlling the operation is selected such that the state of the machine remains in that special subset 515 of the feasible region, and the feasible region is generated also according to Equation (4), (6), (7) then there is a guarantee that the resulting optimal trajectory tracks the reference trajectory with the bounded error and every future state of the machine always admits at least one feasible control action. In this case, the subset 515 is a control invariant set. For example, the selection of the control action can be performed by optimizing a cost function representing the operation of the machine subject to constraints defined by that special subset 515 of the feasible region, as contrasted with the optimization within the feasible region 510.

Figure 6:
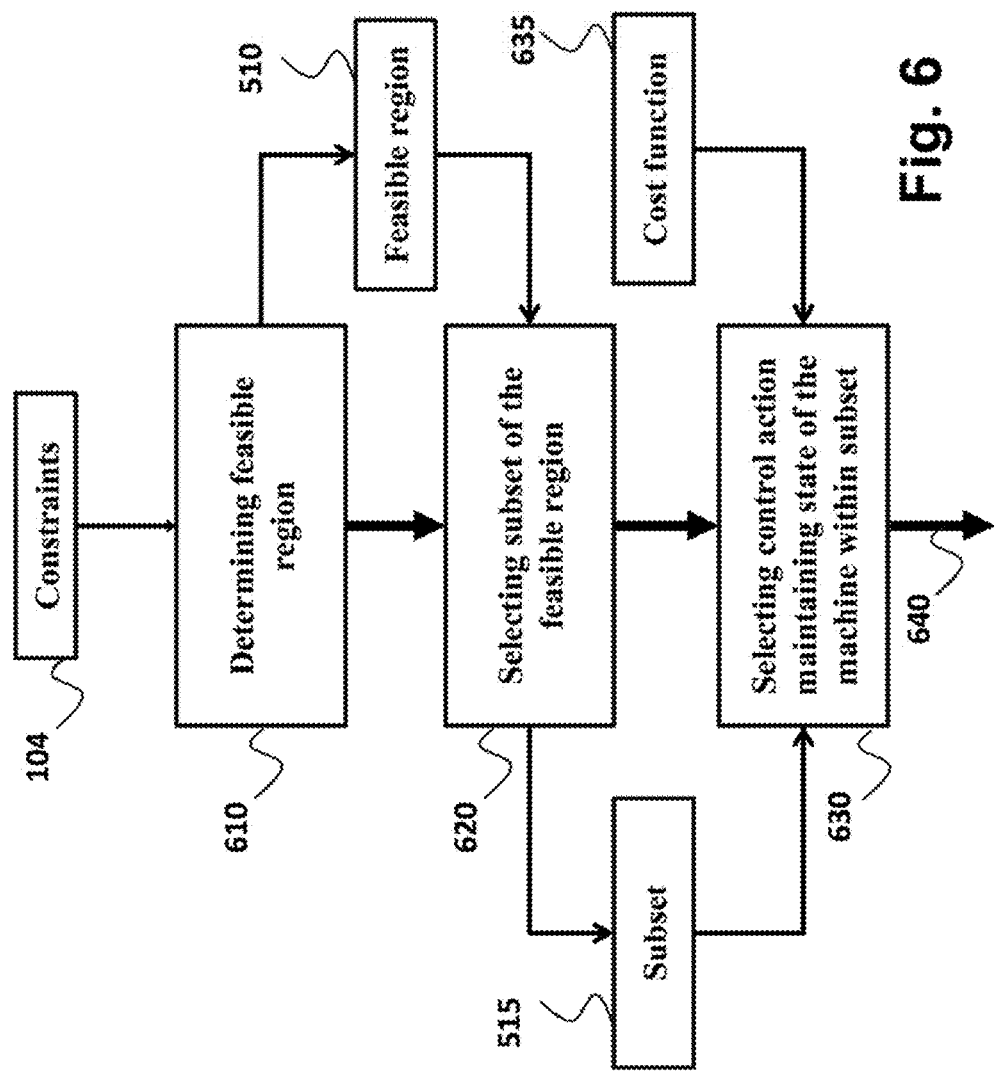
FIG. 6 is a block diagram of a method for controlling an operation of a machine according to a model of a reference trajectory in accordance with one embodiment of the invention.

FIG. 6 shows a block diagram of a method for controlling an operation of a machine according to a model of a reference trajectory in accordance with some embodiments of the invention. The method can be implemented in a processor 291 of the controller 205.

The method determines 610 a feasible region 510 of a state of the machine and a state of the reference trajectory defined by constraints 204 including constraints of the machine, constraints on transient of the reference trajectory and constraints on a range of motion of a fast actuator of the laser processing machine. Next, the method selects 620 a subset 515 of the feasible region, such that from any state of the machine within the subset, there is a control maintaining the state of the machine within the subset and selects 630 a control action 640 for controlling the operation such that the state of the machine remains in the subset. In one embodiment, the selecting includes optimizing a cost function 635 representing the operation of the machine subject to constraints defined by the subset region 515. The cost function is optimized iteratively for a fixed time horizon to produce a control action 640 of a current iteration.

In some embodiments, all steps of the method of FIG. 6 are executed during the operation of the machine. In alternative embodiments, the steps 610, 620 are executed before the machine operation, and the cost function 635 or other principles of the selection of the control action are also defined before machine operation. Such operations can be executed either in a microprocessor or in a general purpose computing machine, such as a desktop computer, laptop, or engineering workstation. The results of step 620 and the cost function 635 are programmed in the memory 292 of the microprocessor 291, and the step 630 is the only step that is repeatedly executed during operation of the machine.

Determining Control Invariant Subsets of Feasible Region

Some embodiments determine the set 515 as a control invariant set for the machine model (3) and reference model (5) subject to constraints (4), (6), (7), (9). In some variations, when the reference input γ is unknown, the set 515 is a control invariant set for the machine and reference of Equations (3), (5) subject to constraints given by Equations (4), (6), (7), (9) for disturbances γ in the set Γ of the reference inputs.

Figure 7:
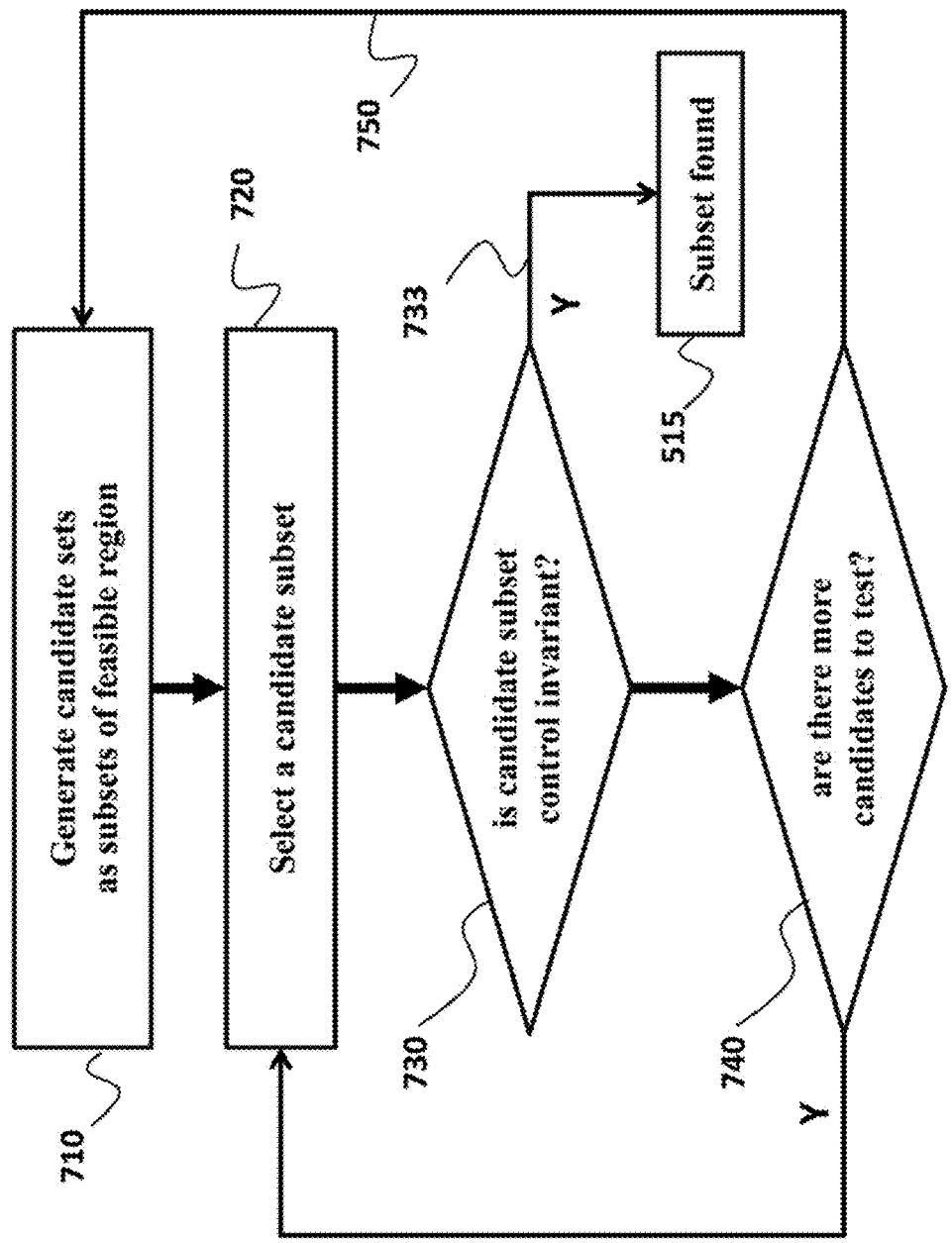
FIG. 7 is a block diagram of a method for determining a control invariant subset according to one embodiment of the invention.

FIG. 7 shows a block diagram of a method for determining the set 515 according to one embodiment. The method generates 710 a number of candidate sets as subsets of the feasible region 510. A candidate subset 720 is selected from the feasible region, and tested 730 to verify whether the candidate subset is a control invariant. If yes 733, the candidate subset is selected as the subset 515 and the methods terminates. Otherwise, if another candidate subset is available 740, the next candidate subset is selected and the test is repeated. Otherwise 750, new candidates are generated 710.

Figure 8:
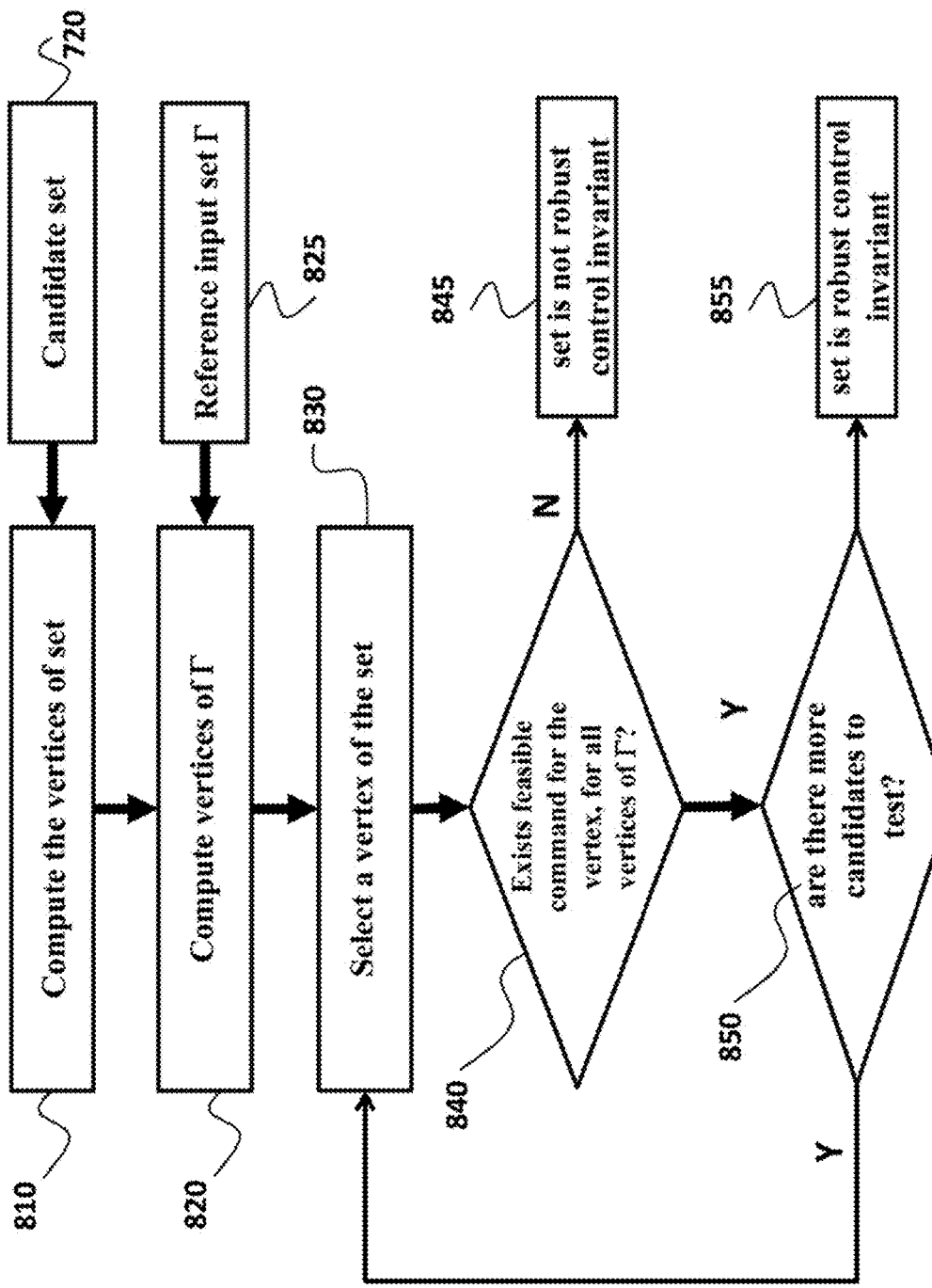
FIG. 8 is a block diagram of a test according to one embodiment of the invention for verifying whether a polyhedral candidate subset is the control invariant.

FIG. 8 shows a block diagram of a test according to one embodiment of the invention for verifying whether a polyhedral candidate subset 720 is control invariant. The method computes 810 the vertices of the polyhedron candidate set 720 and computes 820 the vertices of polyhedral set Γ 825 of the reference inputs. Then, a vertex of the candidate set is selected 830, and checked 840 whether there exists a control action u such that for every vertex of Γ the constraints in Equations (4), (9), are satisfied. This step can be implemented by search or mathematical programming. If such control action u cannot be found, then the set is not control invariant 845. If such control action can be found and there are no more vertices to be checked 850, then the set is robust control invariant 855. Otherwise, the next vertex is selected.

However, the generation and verification of candidate sets can take a significant amount of time, and one embodiment uses an automated procedure to generate and verify the candidate sets.

Because the subset 515 is a control invariant set, a method for control invariant set computation can be used for generating the set 515. Such a method can be modified with the capability of enforcing constraints in Eqn. (5) and considering the input γ to the model of the reference (5) as source of uncertainty.

Figure 9:
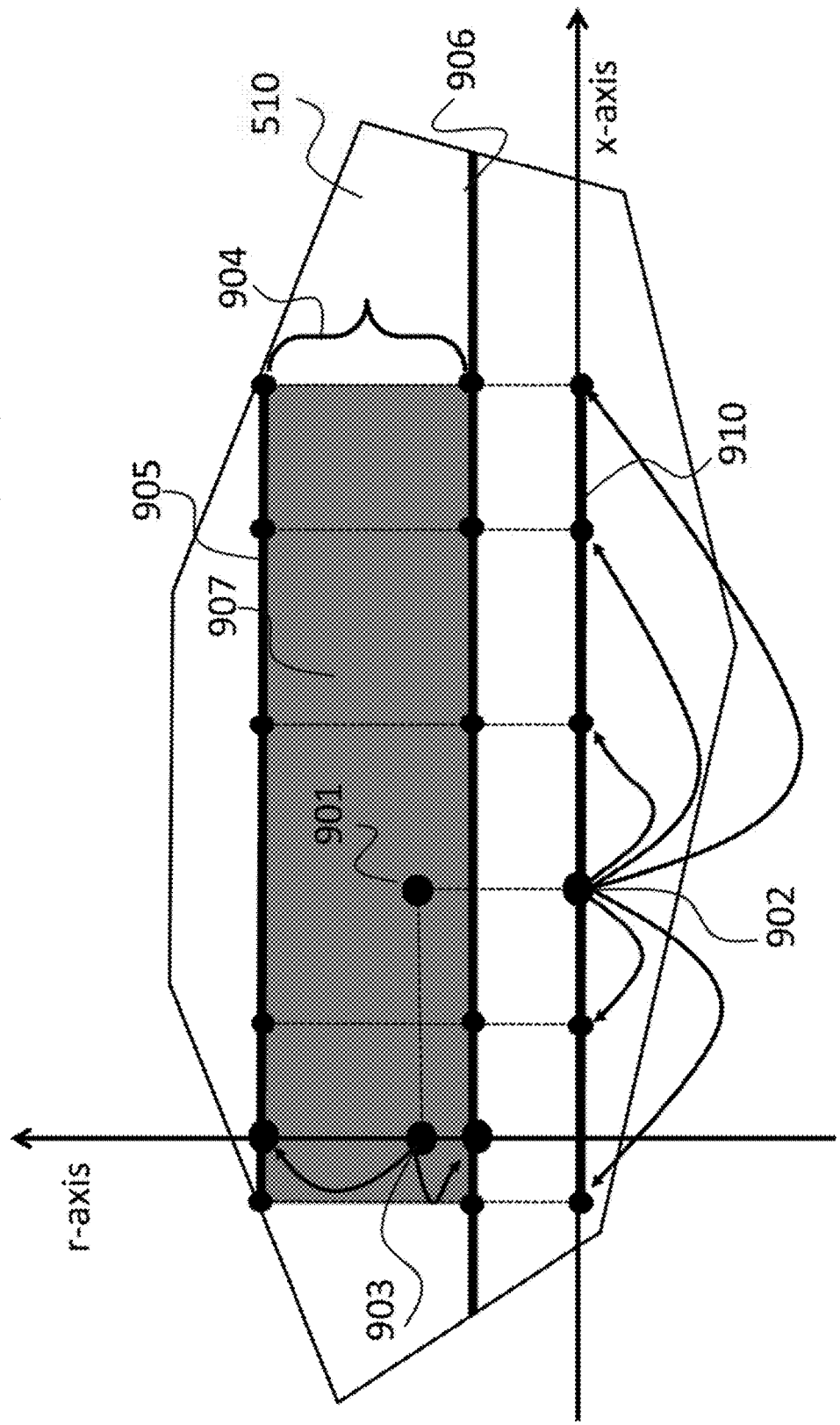
FIG. 9 is a schematic of some principles behind the determination of the control invariant subset according to one embodiment of the invention.

FIG. 9 illustrates the principles behind the determination of the subset 515 according to one embodiment of the invention. The feasible set 510 of the state of the machine state and the state of the reference trajectory is $$X_{x,r} = \{[x'r']: x \in X, \|y-d\| \leq \varepsilon, r \in R\}, \qquad (12)$$

The state of the machine 902 and the state of the reference trajectory 903 define a point in (x,r) 901 in the feasible region 510. Given the admissible set 904 for future states of the reference trajectory according to $$C_\gamma(r) = \{\gamma: A_r r + B_r \gamma \in R\}, \qquad (13)$$

the future state of the machine and the future state of the reference trajectory can be anywhere in the polyhedron 907, delimited by segments 905, 906. Thus, the controller can take any control action such that the future state of the machine 902 remains in the segment 910, so that the combination of the future machine state and future reference state remains in the polyhedron 907.

If the set $\underline{C}_{x,r}$ 907 is such that there is always a control action that keeps the machine state and reference state 901 in the set 907 for the entire admissible range of the reference 904

$$\underline{C}_{x,r} = \{[x'r'] \in C_{x,r}: \exists u \in U, Ax+Bu \in X, \|C(Ax+Bu) - C_\gamma(A_r r + B_r \gamma)\| \leq \varepsilon, \forall \gamma \in C_\gamma\}, \qquad (14)$$

it is always possible to guarantee $$[(Ax+Bu)'(A_r r + B_r \gamma)'] \in \underline{C}_{x,r},$$

which guarantees that the constraints on the machine and on the tracking error bounds are satisfied. Notably, this procedure can be repeated at a next step because the update states are still inside $\underline{C}_{x,r}$, hence recursively guaranteeing the constraints enforcement.

Figure 10:
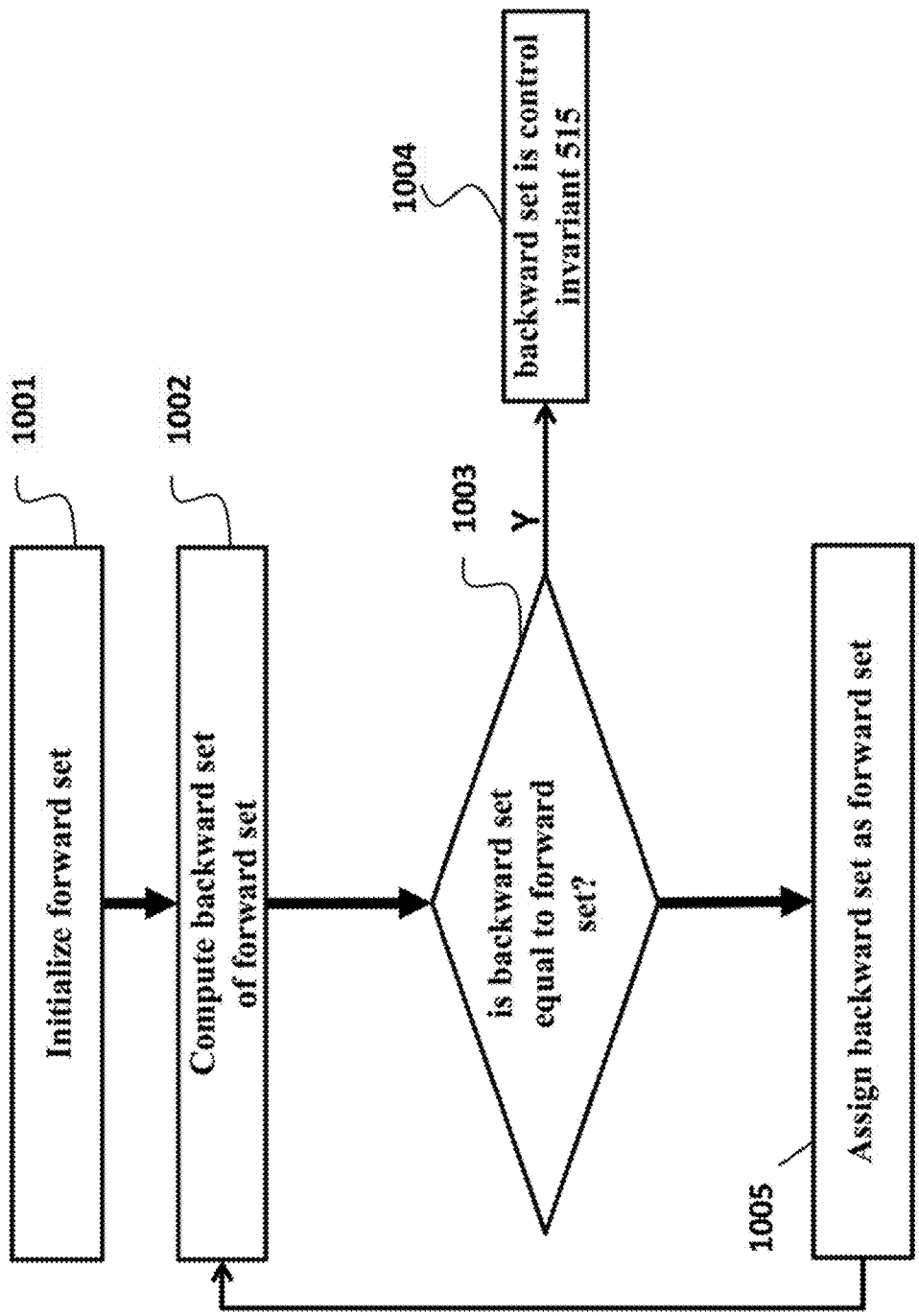
FIG. 10 is a diagram of a method for selecting the control invariant subset by performing iteratively a backward-reachable region computation according to one embodiment of the invention.

FIG. 10 shows a diagram of a method for selecting the subset $\underline{C}_{x,r}$ by performing iteratively a backward-reachable region computation until a termination condition is satisfied. The backward-reachable region computation removes all states from the current feasible region for which there is no control that maintains the state of the machine within the feasible region for reference trajectories satisfying the constraints on the transient of the reference trajectory.

For example, the backward-reachable region computation initializes 1001 at a step k=0 a current feasible region 1001 as the feasible region 510, $$\Omega_0 = \{[x'r'] \in X_{x,r}\}$$

then determines 1002 a backward-reachable region of the states of the machine and reference trajectory that can be transition to the current feasible region for all the value of the admissible reference input according to $$\Omega_{k+1} = Pre(\Omega_k, C_\gamma(r)) = \{[x'r'] \in X_{x,r}: \exists U \in U, (Ax+Bu, A_r r + B_r \gamma) \in \Omega_k, \forall \gamma \in C_\gamma(r)\} \qquad (15)$$

The computation of Equation (15) removes the states of the backward reachable region for which there exists no control action that keeps states into the current feasible region for all the admissible values of the future state of the reference.

At step 1003 the computation tests if the backward-reachable region is equal to the current feasible region, i.e., $\Omega_{k+1}=\Omega_k$, If yes 1004, the backward-reachable region is control invariant 515 and the computation stops. Otherwise 1005, the backward-reachable region is used as current feasible region in the next iteration (k=k+1) of the computation.

The backward-reachable region computation of FIG. 10 returns the largest existing control invariant set. However, because the set of admissible reference inputs is state dependent, the control invariant set is not a single convex polyhedron but a set of convex polyhedra, which makes the use of such subset in a real time control difficult. Also, the backward-reachable region computation of FIG. 10 can take significant amount of time (days, weeks, months).

Figure 11:
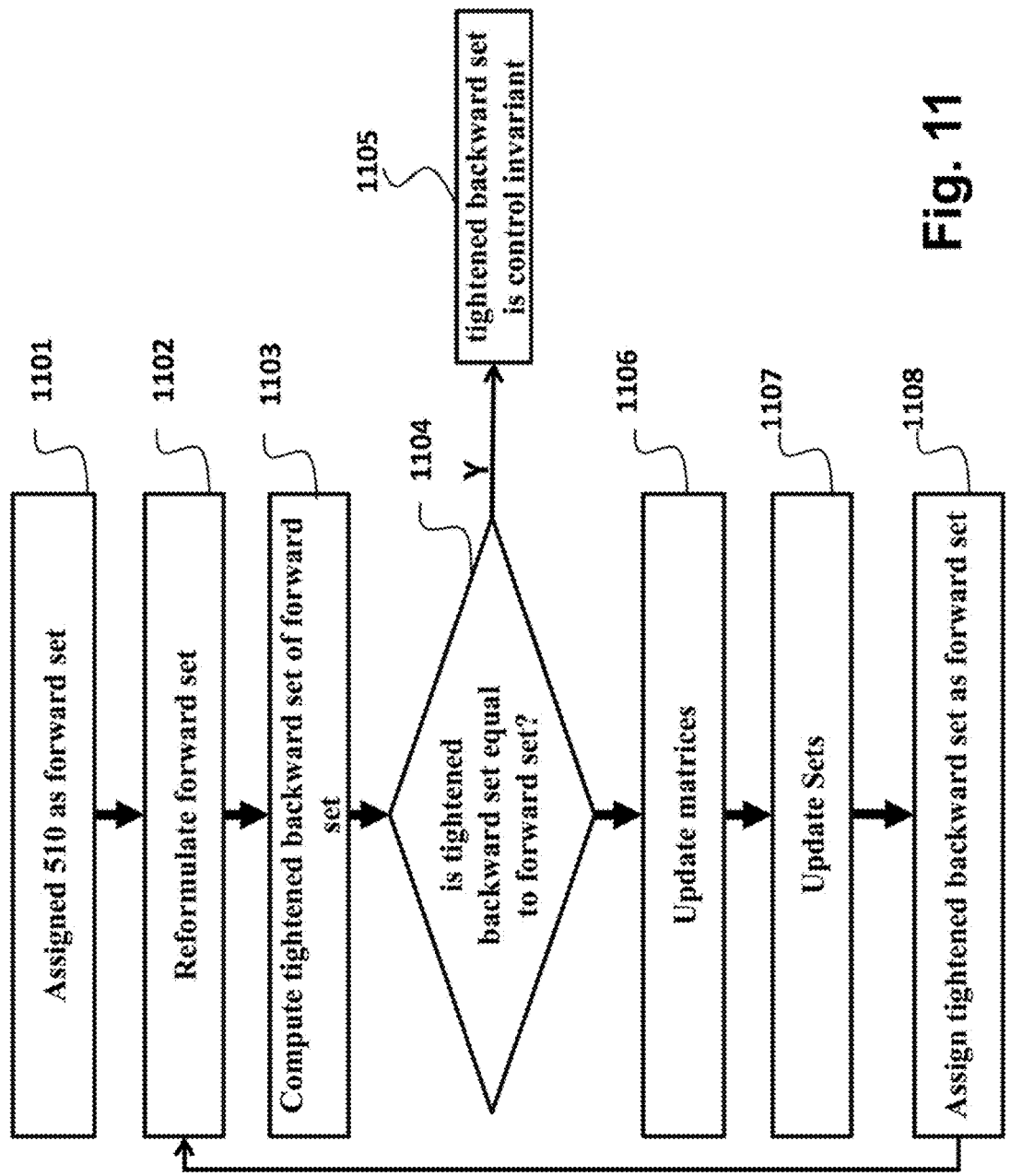
FIG. 11 is a block diagram of an alternative method that determines the control invariant set.

FIG. 11 shows a block diagram of an alternative method that determines a control invariant set which is slightly smaller than the largest subset, but is a single convex polyhedron. Also, the method of FIG. 11 is much faster, e.g., can determined the control invariant subset within minutes and/or hours.

The method initializes 1101 the matrices M, L, and the sets F, X, as $$k=0, M_0=C, L_0=C_r, F_0=\{e:\|e\|\leq\epsilon\}, X_0=X$$

and the current feasible region $$\Omega_0=\{[x'r']\in X_{x,r}:r\in C_r^\infty, (Cx-C_r r)\in F_0)\}.$$

Initially, the current feasible region is the feasible region. The method is performed iteratively, such that the states that cannot be maintained in the current feasible region for all the admissible values of the future disturbance are removed, thus forming a new current feasible region. The current feasible region is reformulated 1102 as polyhedral invariant subset of feasible region, in details as an intersection of a set of the states of the machine satisfying the constraints of the machine, the set of states on the trajectory satisfying some constraints on the transient of the reference trajectory, and the set of the states satisfying the error bounds constraints, such that a forward set Ωk in the form $$\Omega_k=\{[x'r']\in X_{x,r}: r\in C_r^\infty, r\in X, (M_k x-L_k r)\in F_k\},$$

is obtained, where the constraints $r\in C_r^\infty$ the maximum output admissible set for the reference trajectory state that is the largest set of reference trajectory states for which the reference state admits input for which all the constraints (6), are satisfied. To that end, checking the constraints on the state of the machine and the constraints on the state of the reference trajectory are decoupled and the full range of reference input allowing the reference trajectory to move from an admissible state, regardless if the future state of the reference trajectory is admissible, is accepted.

Then, the tightened backward-reachable region is determined 1103 according to $$\Omega_{k+1}=\{[x'r']\in X_{x,r}: \exists u\in U, r\in C_r^\infty, Ax+Bu\in X_k, (M_k(Ax+Bu)-L_k(A_r r+B_r\gamma))\in F_k, \forall\gamma\in\Gamma\}.$$

If the tightened backward-reachable region equals 1104 the current feasible region, i.e., $$\Omega_{k+1}=\Omega_k,$$

then 1105 the tightened backward-reachable region is control invariant 515 and the algorithm stops with $$C_{x,r}=\Omega_k.$$

Otherwise 1106, the matrices M, L are updated as $$M_{k+1}=M_k A, L_{k+1}=L_k A_r$$

and 1107 the sets F, X are updated as $$X_{k+1}=\{x\in X: Ax+Bu\in X_k\}$$

$$F_{k+1}=\{v: \exists u\in U, \exists b\in F_k, v=b-M_k Bu+L_k B_r\gamma, \forall\gamma\in\Gamma\}.$$

Then, the tightened backward-reachable region is assigned as new current feasible region 1108, and a new iteration is performed from 1102 with k=k+1.

Because in the method of FIG. 1I the variable γ is now independent of the variable r, the resulting set $C_{x,r}$ is a polytope.

Figure 12:
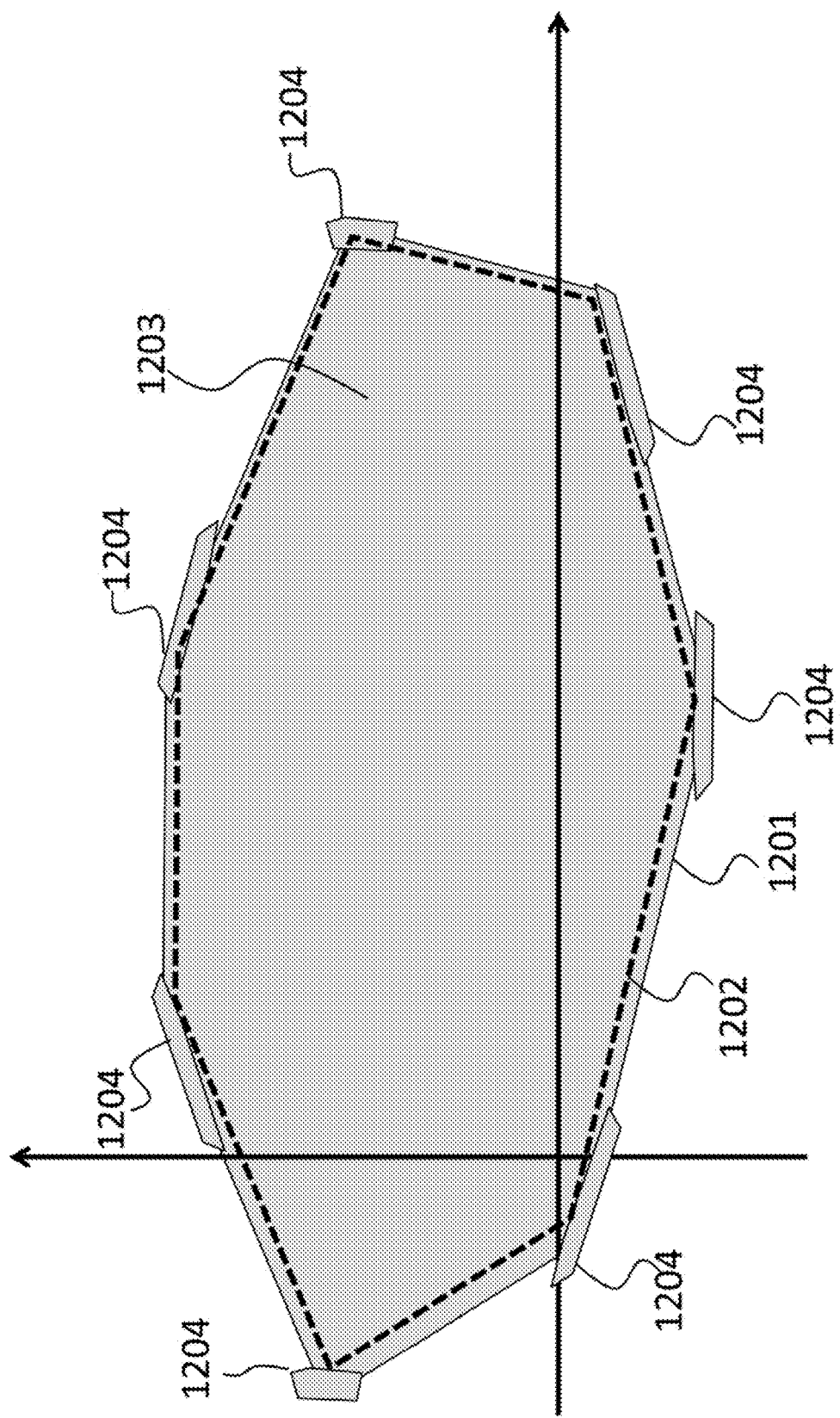
FIG. 12 is a schematic of an effect of the method of FIG. 11 with respect to the method of FIG. 10.

FIG. 12 shows an effect of the method of FIG. 11 with respect to the method of FIG. 10. Because the dependence of the reference input γ on the reference state r is ignored, the subset 1201 obtained by the method of FIG. 11 is smaller than the set 1202 obtained by the method of FIG. 10, but the subset 1201 is a single convex polyhedron, while the subset 1202 includes a larger convex polyhedron 1203 and multiple smaller convex polyhedral 1204 at the borders, the union of which is not convex.

Optimizing Rate of Change of the Reference Trajectory

Some embodiments of the invention determine iteratively the subset of the feasible region and the constraints of the reference trajectory optimizing a processing speed of the slow actuator. The bounds of the rate of change γ, i.e., $(\gamma_{min}, \gamma_{max})$ in equation (7) determines how fast the slow actuator can move the reference position for the laser beam. If the bounds of the rate of change force γ to be too small, the reference position does not move much and the laser processing is slow. If the bounds of the rate of change allow γ to be large, the laser processing is faster, If the bounds of the rate of change allow γ to be too large, the subset of the feasible region can be empty. Accordingly, some embodiments select a highest rate of change of the reference trajectory resulting in a nonempty subset of the feasible region.

Figure 13:
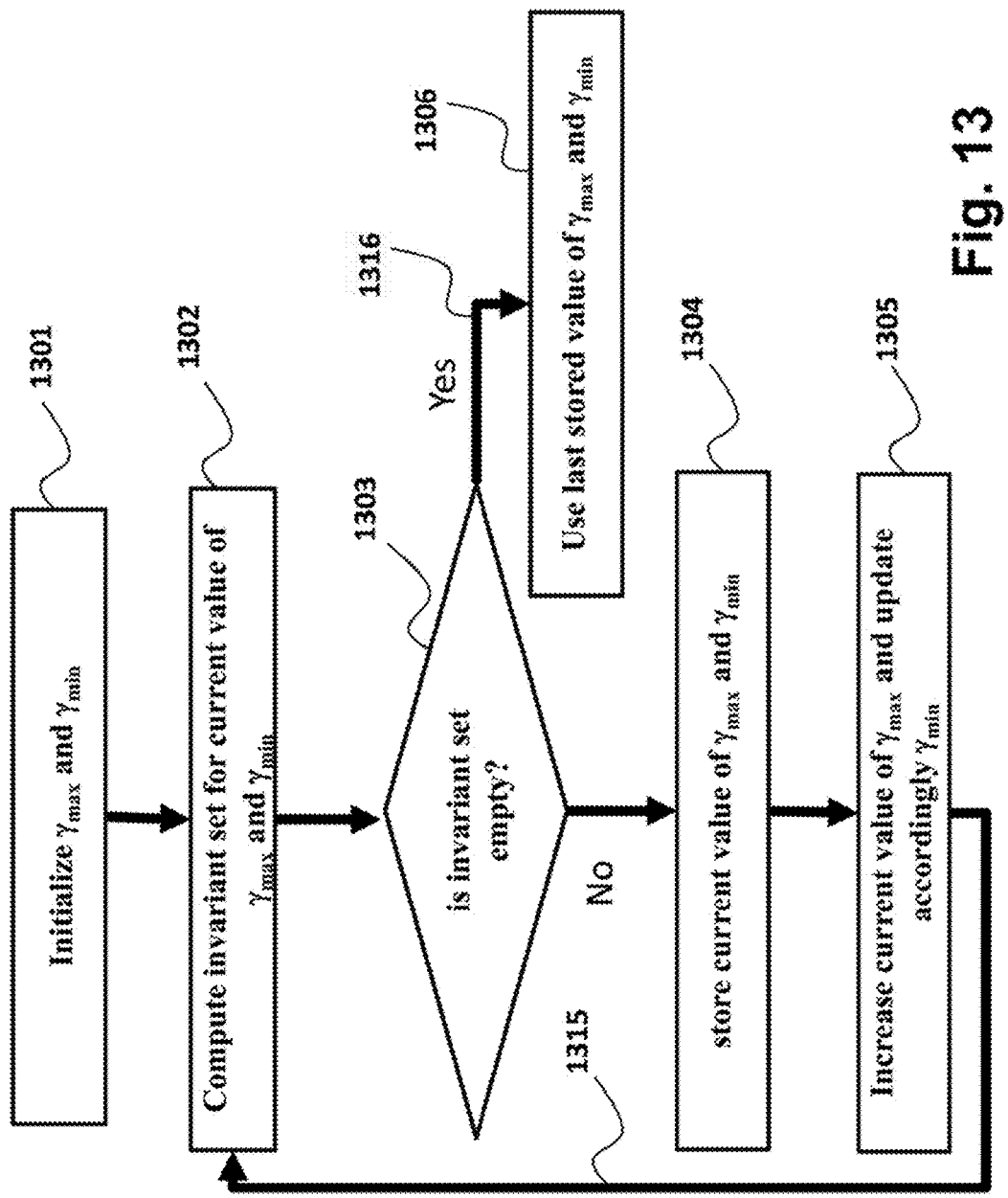
FIGS. 13 and 14 are block diagrams of method for determining a rate of change of the reference trajectory of a slow actuator of the laser processing machine according to different embodiments of the invention.

FIG. 13 is a block diagram of a method for determining the bounds of the rate of change of the reference trajectory according to one embodiment of the invention. The method initializes 1301 the rate of change to a value greater than zero. Usually, this value is small and $\gamma_{min}$ is initialized to $-\gamma_{max}$. Then, the method determines 1302 the subset of the feasible region for the value of the rate of change of the reference trajectory, using, e.g., a method of FIG. 11. The volume of the subset is tested 1303, and the subset is a non-empty, then rate of change is stored 1304. In one variation, the new value of the rate of change replaces any previously stored value. In another variation, all values are stored forming a set of pairs of values of the rate of change and volumes of the subset of the feasible region.

Next, the method increases 1304 the value of the rate of change of the reference trajectory and repeats 1315 the determining the subset and the increasing the value until 1316 the subset of the feasible region is empty. In such a manner, the last stored value 1306 of the rate of change is the highest rate of change of the reference trajectory resulting in the nonempty subset of the feasible region.

Figure 14:
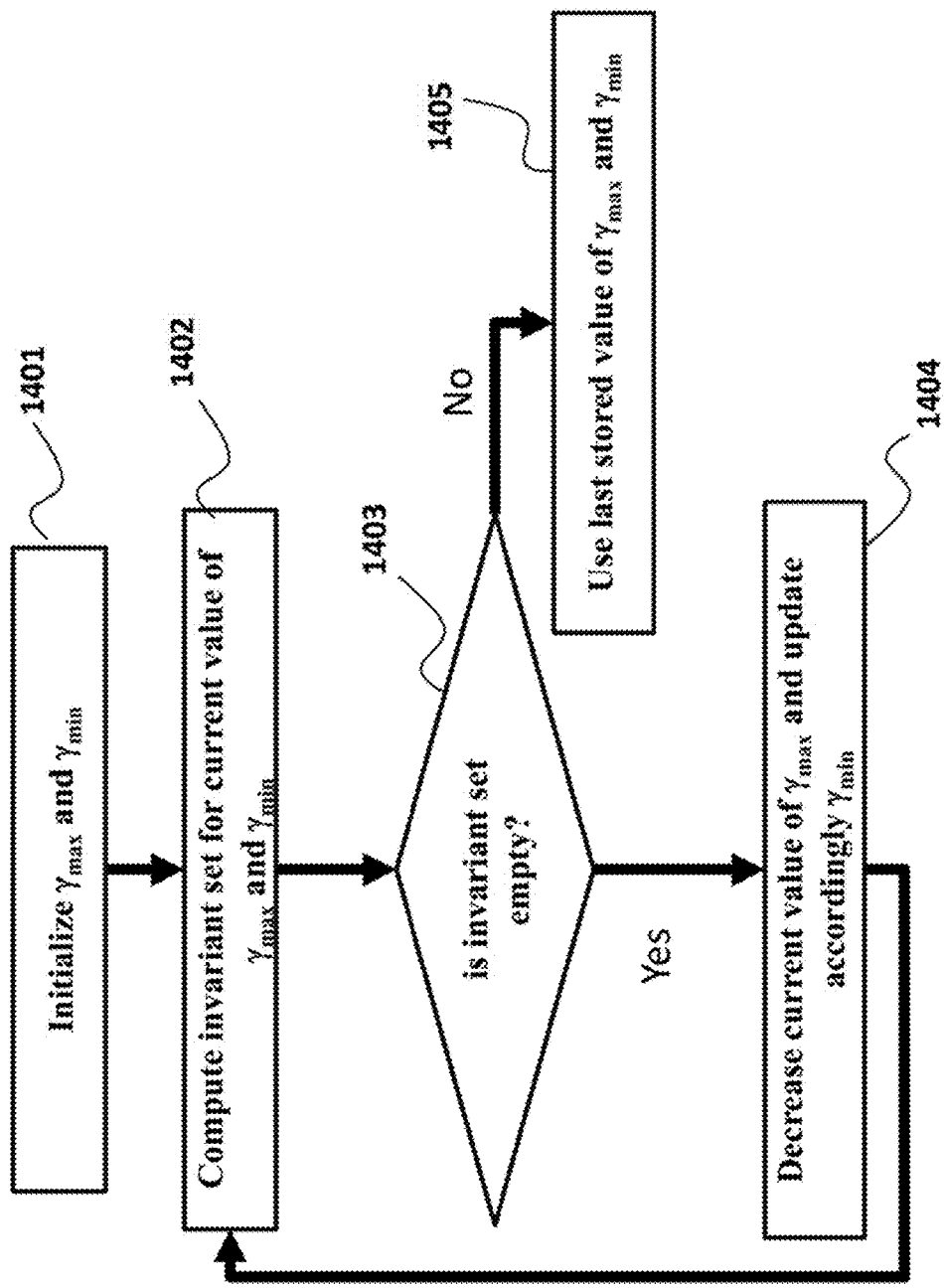

FIG. 14 shows a block diagram of a method for determining the rate of change of the reference trajectory according another embodiment of the invention. In this embodiment, the method selects 1401 a value of the rate of change of the reference trajectory resulting in an empty 1403 subset of the feasible region; and decreases 1404 iteratively the value of the rate of change of the reference trajectory until the decreased value results 1402 in a nonempty subset of the feasible region. In such a manner, the last stored value 1406 of the rate of change is the highest rate of change of the reference trajectory resulting in the nonempty subset of the feasible region.

The increase 1305 and/or the decrease 1404 can be performed in a variety of ways, for instance by adding/removing a constant term to the current value of the rate of change $\gamma_{max}$ or by adding a term related to the current value of $\gamma_{max}$.

Figure 15:
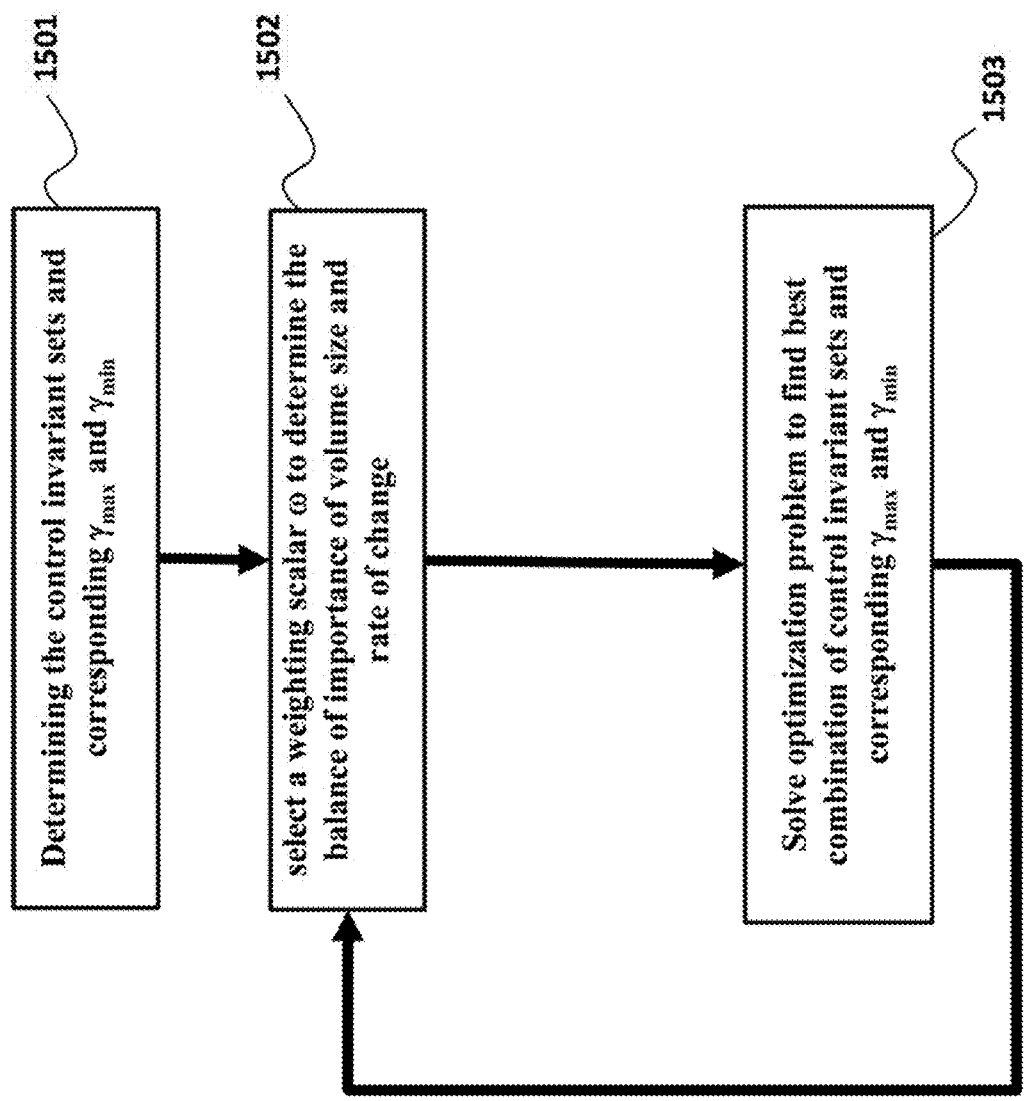
FIG. 15 is a block diagram of a method optimizing a combination of a value of the rate of change and a volume of the subset of the feasible region according to some embodiments.

FIG. 15 shows a block diagram of a method optimizing a combination of a value of the rate of change and a volume of the subset of the feasible region according to some embodiments. This embodiment is based on recognition that the high rate of change of the reference trajectory can be balance with a volume of the subset of the feasible region.

The method determines a set of pairs of values of the rate of change and volumes of the subset of the feasible region. For example, such a set can be determined during an execution of the methods of FIG. 13 or 14 that maintain all the previously found values of $\gamma_{max}$ in $\{\gamma_{max}^{(1)}, \gamma_{max}^{(2)}, \ldots, \gamma_{max}^{(k)}\}$ and the corresponding control invariant sets $\{C_{x,r}^{(1)}, C_{x,r}^{(2)}, \ldots, C_{x,r}^{(k)}\}$. Next, the method selects 1503 from the set a pair optimizing a combination of a value of the rate of change and a volume of the subset of the feasible region. In one embodiment, the optimization also selects 1502 a positive scalar ω defining the relative importance of processing speed versus other objectives such as limiting accelerations and sudden movements, energy consumption, etc.

Then value of $\gamma_{max}$ is determined 1503 by solving an optimization problem $$\gamma_{max} = \gamma_{max}^{(i)}:$$
$$i = \mathrm{argmax}_i \; V(C_{[x,r]}^i) + \omega \gamma_{max}^i\}$$
$$\text{s.t.} \quad i = 1, \ldots, N_k$$

where $N_k$ is the total number of non-empty control invariant set found in 1503, and V(C) is a measure of the size of the set C, such as the volume, possibly scaled, the surface, or the maximum inscribed circle. The selected value of $\gamma_{max}$ is used in equation (7).

Selection of Reference Trajectory

In laser processing machine applications, the reference trajectory is usually defined as points in space, i.e., a space-based trajectory, and for the application of controls, a time-based trajectory needs to be determined. Hence, some embodiments are based on a realization that the rate of change of the reference trajectory can be used for generating the time-based reference trajectory from the space-based trajectory.

Some embodiments determine the reference trajectory for the slow actuator as a function of time such that the reference trajectory satisfies the rate of change of the reference trajectory. For example, one embodiment applies a rate bounding filter to the processing pattern such that a change of position of a laser point within a control period of the machine is less than the rate of change of the reference trajectory.

The reference trajectory is a time-based reference trajectory of the slow actuator tracking the processor pattern with an error bounded by a range of motion of the fast actuator of the laser processing machine, such that a control action that changes a state of the slow actuator according to the reference trajectory maintains the state of the slow actuator within a subset of the feasible region of states of the slow actuator and states of the reference trajectory.

Some embodiments of the invention determine a future feasible reference point for a current reference point. The feasible point is a reference point on the reference trajectory of the slow actuator, such that the slow actuator controlled to that reference point satisfies the constraints in the equations (5), (6) for a value of the rate of change that satisfies bounds in the equation (7), and that all the reference points between the current reference point and the future reference point are at a distance lesser than the size of the range of the fast actuator, and that enough time in one control sampling period is available for the fast actuator to process all intermediate points on the processing pattern.

Figure 16:
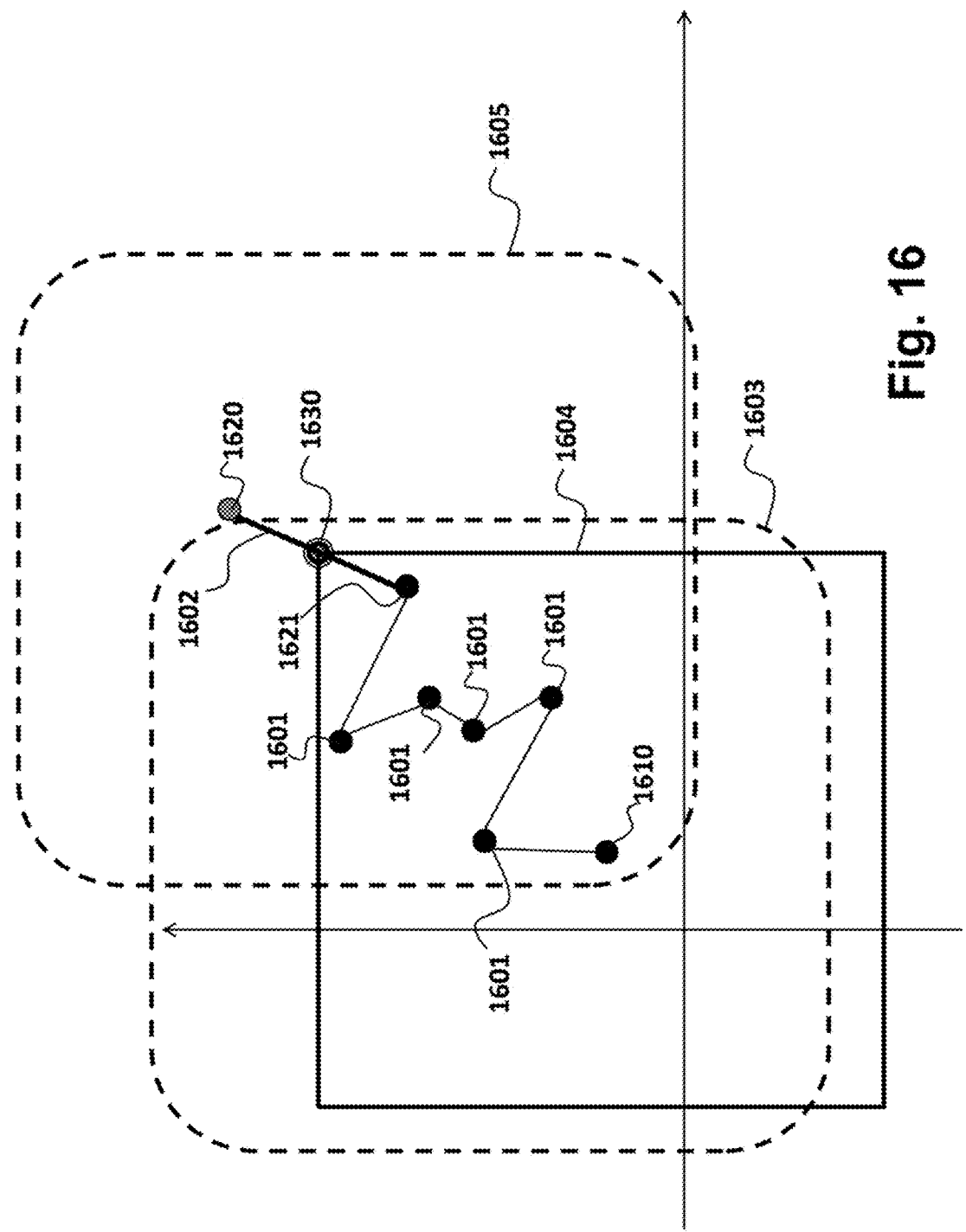
FIGS. 16 and 17 are schematics of some embodiments of the invention for determining the reference trajectory.
Figure 17:
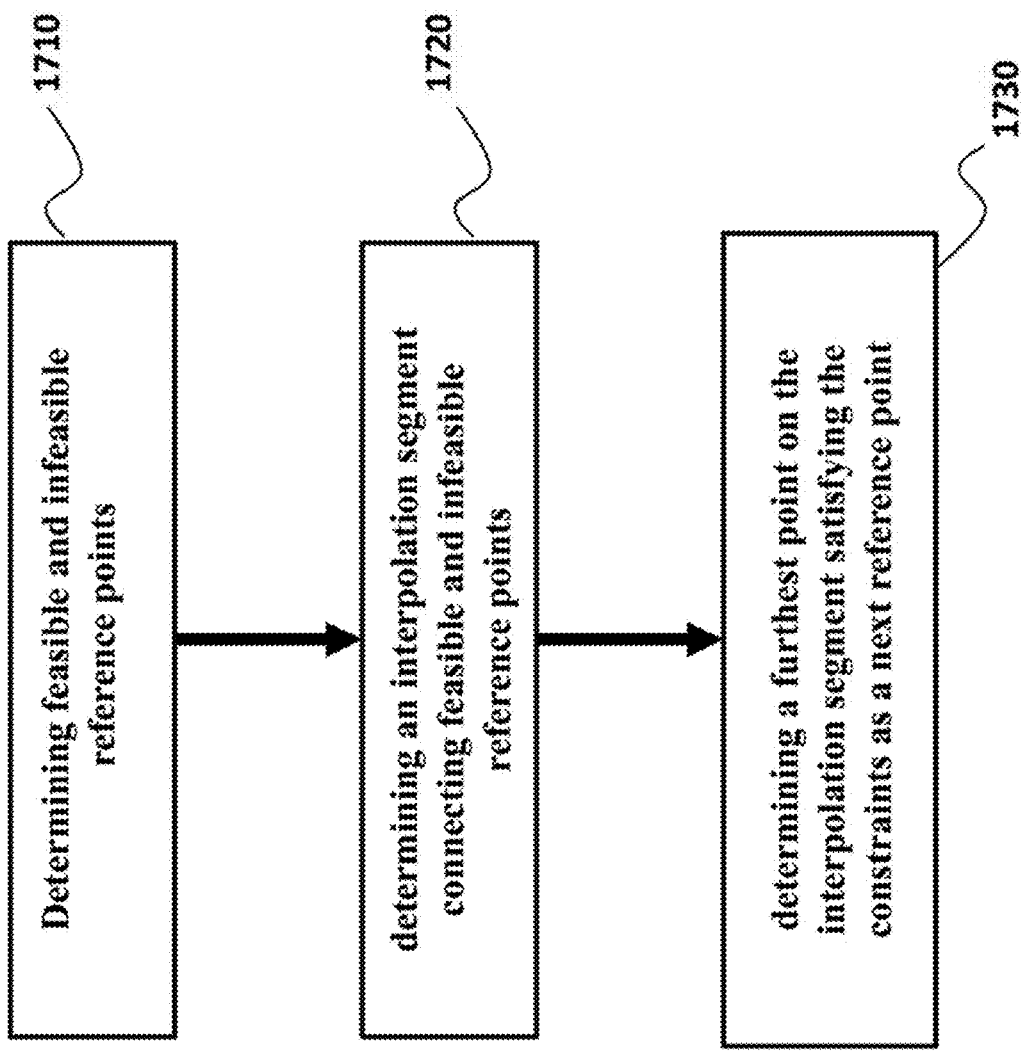

FIGS. 16 and 17 show some embodiments of the invention for determining the reference trajectory. The feasible reference points 1601 can be found according to the range 1603 of the fast actuator from current reference point 1610 and according to range of achievable motions 1604 as defined by equations (5), (6), and (7). The point 1620 is the first infeasible point outside of the range 1603 and/or the range 1604. The point 1621 is the last feasible next reference point.

Accordingly, some embodiments determine 1710, for a current reference point on the reference trajectory, a future feasible reference point, e.g., the point 1621, satisfying the constraints on the reference trajectory and a future infeasible point, e.g., the point 1620 violating the constraints on the reference trajectory. Next, the embodiment determines 1720 an interpolation segment 1602 connecting the future feasible 1621 and the future infeasible 1620 reference points, and determines 1730 a point 1630, furthest from the feasible point 1621 on the interpolation segment 1602 satisfying the constraints. In other words, the point 1630 can be identified as the closest point to the point 1620 in the segment 1602 such that the point is covered by the range 1605 of the fast actuator at current reference point, is in the range of achievable motions 1604, the current reference point 1610 is in the range of the 1605 of the fast actuator centered at the point 1630, all intermediate points 1601 are covered by ranges 1603 and 1605, and there is enough time for the laser to operate all the intermediate points 1601. The point 1630 is a next reference point of the reference trajectory.

Figure 18:
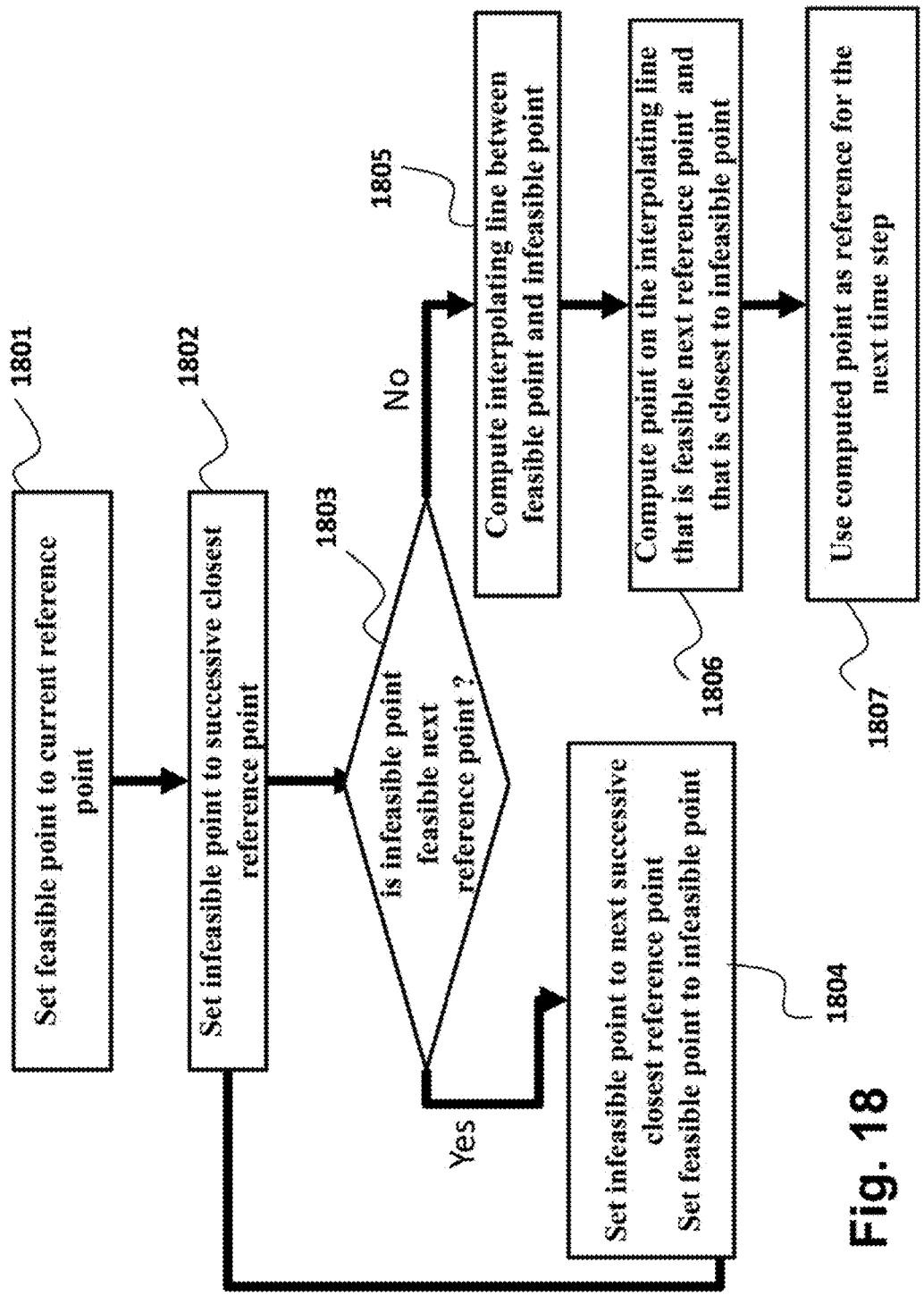
FIG. 18 is a block diagram of a method according to another embodiment that uses some principled discussed in reference with FIGS. 16 and 17.

FIG. 18 shows a block diagram of a method according to another embodiment that uses some principled discussed in reference with FIGS. 16 and 17. The feasible point 1801 is initialized as the current reference point, and the infeasible point 1802 is initialized as the successive closest reference point. If 1803 the infeasible point is a feasible next reference point, then 1804 the feasible point value is updated to the current value of the infeasible point and the infeasible point value is updated to the value of the successive closest point to the current infeasible point. If the infeasible point is not a feasible next reference point, then the interpolating segment 1805 between the feasible point and the infeasible point is determined, and the feasible point in the interpolating segment that is closest to the infeasible point is determined 1806. Such point 2507 is used as the next reference point at the following sampling period of the control method.

The method above provides the fastest processing that is achievable with guarantees that no constraints are ever violated in the future, for all the references that are feasible.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling an operation of a laser processing machine with redundant actuators including a first actuator and a second actuator to place a laser beam along a reference trajectory by joint motions of the first actuator and the second actuator, wherein the method uses a processor coupled to a memory storing a model of the reference trajectory, constraints of the laser processing machine including physical constraints of a structure of the laser processing machine, constraints on the reference trajectory including constraints on a rate of change of the reference trajectory, constraints on a range of motion of the first actuator, and constraints on a range of motion of the second actuator, wherein a composition of the range of motion of the first actuator and the range of motion of the second actuator represent a range of possible positions of the laser beam controlled by the first or the second actuators, wherein the range of motion of the first actuator is greater than the range of motion of the second actuator, wherein the processor is coupled with stored instructions implementing the method, wherein the instructions, when executed by the processor carry out steps of the method, comprising:

determining, using the processor, a feasible region for states of the first actuator and states of a reference trajectory of the first actuator, wherein the feasible region is defined by the constraints of the laser processing machine, the constraints on the reference trajectory, and the constraints on the range of motion of the second actuator, wherein the states of the first actuator include positions and velocity of the first actuator, wherein the states of the reference trajectory of the first actuator include positions of the reference trajectory of the first actuator;

selecting, using the processor, a subset of the feasible region forming a convex region of the states of the first actuator and the states of the reference trajectory of the first actuator, such that for any state of the first actuator and any state of the reference trajectory of the first actuator within the subset, there is an admissible control maintaining the state of the first actuator within the subset of the feasible region for admissible future states of the reference trajectory, wherein the admissible future states of the reference trajectory are determined according to the model of the reference trajectory and the constraints on the reference trajectory, wherein the model of the reference trajectory includes a position and a rate of change of the reference trajectory represented by states of the model of the reference trajectory, inputs to the model of the reference trajectory, or combination thereof;

selecting, using the processor, a first admissible control action maintaining the state of the first actuator within the subset of the feasible region;

determining, using the processor, a second admissible control action based on a difference between the state of the reference trajectory and the state of the first actuator controlled by the first admissible control action; and controlling, using the processor, the first actuator using the first admissible control action and controlling the second actuator using the second admissible control action to jointly place the laser beam on the reference trajectory.

2. The method of claim 1, wherein the constraints on the reference trajectory includes a rate of change of the reference trajectory, further comprising:

determining the model of the reference trajectory modeling a position and the rate of change of the reference trajectory as a function of time.

3. The method of claim 1, wherein the selecting the subset of the feasible region comprises:

determining iteratively the subset of the feasible region and the constraints of the reference trajectory by optimizing a processing speed of the first actuator.

4. The method of claim 3, further comprising:

selecting a highest rate of change of the reference trajectory resulting in the subset of the feasible region being nonempty.

5. The method of claim 4, further comprising:

determining the subset of the feasible region for a value of the rate of change of the reference trajectory;

increasing a value of the rate of change of the reference trajectory; and repeating the determining the subset and the increasing the value until the subset of the feasible region is empty.

6. The method of claim 4, further comprising:

selecting a value of the rate of change of the reference trajectory resulting in an empty subset of the feasible region; and decreasing iteratively the value of the rate of change of the reference trajectory until the value results in a non-empty subset of the feasible region.

7. The method of claim 3, further comprising:

determining a set of pairs of values of the rate of change and a size of the subset of the corresponding feasible region; and selecting from the set of pairs a pair optimizing a combination of a value of the rate of change and the size of the subset of the feasible region.

8. The method of claim 4, further comprising:
determining, according to a processing pattern, the reference trajectory of the first actuator as a function of time such that the reference trajectory of the first actuator has the highest rate of change.

9. The method of the claim 8, further comprising:
applying a rate bounding filter to the processing pattern, such that a change of position of a laser point within a control period of the machine is less than the rate of change of the reference trajectory and processing speed limitations imposed by the second actuator are satisfied for the change of position of the laser point.

10. The method of the claim 8, further comprising:
determining for a current reference point on the reference trajectory of the first actuator a future feasible reference point satisfying the constraints on the reference trajectory and a future infeasible point violating the constraints on the reference trajectory;
determining an interpolation segment connecting the future feasible and the future infeasible reference points; and
determining a furthest point on the interpolation segment satisfying the constraints as a next reference point.

11. The method of claim 1, wherein the selecting further comprises:
testing each state of the feasible region to determine the subset.

12. The method of claim 1, wherein the selecting further comprises:
partitioning the feasible region into a set of subsets; and
selecting the subset satisfying a control invariance test.

13. The method of claim 1, wherein the selecting the subset further comprises:
initializing a current feasible region as the feasible region;
performing iteratively a backward-reachable region computation until a backward reachable region is equal to the current feasible region, wherein, for each iteration, the backward-reachable region computation removes states with no control that maintains the state of the machine within the current feasible region for the reference trajectories satisfying the constraints on a transient of the reference trajectory.

14. The method of claim 13, wherein the backward-reachable region computation comprises:
increasing a dimensionality of the current feasible region by combining the feasible region with a set of admissible control actions to produce a higher dimensional region;
selecting, from the higher dimensional region, combinations of the state of the machine, the state of the reference trajectory and the control action such that the control action maintains the state of the machine within the current feasible region for all the reference trajectories satisfying the constraints on the transient of the reference trajectory; and
selecting unique pairs of the state of the machine and the state of the reference trajectory, such that at least one machine input exists such that the state of the machine, the state of the reference trajectory and the machine inputs are in the higher dimensional region.

15. The method of claim 1, wherein the selecting the control action comprises:
optimizing a cost function representing the operation of the machine subject to constraints defined by the subset using a model of the machine, the model of the reference trajectory, a current state of the machine, and a current state of the reference trajectory.

16. The method of claim 1, wherein the subset of the feasible region is formed by a single convex polyhedron.

\* \* \* \* \*